US008005139B2

(12) United States Patent
Wu et al.

(10) Patent No.: US 8,005,139 B2
(45) Date of Patent: Aug. 23, 2011

(54) ENCODING WITH VISUAL MASKING

(75) Inventors: Hsi Jung Wu, Sunnyvale, CA (US); Thomas Pun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1471 days.

(21) Appl. No.: 11/118,604

(22) Filed: Apr. 28, 2005

(65) Prior Publication Data

US 2005/0286631 A1    Dec. 29, 2005

Related U.S. Application Data

(60) Provisional application No. 60/583,418, filed on Jun. 27, 2004, provisional application No. 60/643,918, filed on Jan. 9, 2005.

(51) Int. Cl.
*H04N 7/12* (2006.01)

(52) U.S. Cl. ............... 375/240.03; 375/240.02

(58) Field of Classification Search ........... 375/240, 375/240.01, 240.02, 240.12, 240.03; 382/236, 382/239, 166, 240; 348/470
See application file for complete search history.

(56) References Cited

U.S. PATENT DOCUMENTS

| | | | |
|---|---|---|---|
| 5,337,049 A | 8/1994 | Shimoda | |
| 5,416,604 A | 5/1995 | Park | |
| 5,473,384 A * | 12/1995 | Jayant et al. | 348/470 |
| 5,691,770 A | 11/1997 | Keesman | |
| 5,790,695 A * | 8/1998 | Suwa | 382/166 |
| 6,101,276 A * | 8/2000 | Adiletta et al. | 382/236 |
| 6,111,991 A | 8/2000 | Ribas-Corbera et al. | |
| 6,148,107 A * | 11/2000 | Ducloux et al. | 382/236 |
| 6,192,075 B1 | 2/2001 | Jeng et al. | |
| 6,229,925 B1 * | 5/2001 | Alexandre et al. | 382/239 |
| 6,278,735 B1 | 8/2001 | Mohsenian | |
| 6,414,992 B1 | 7/2002 | Sriram et al. | |
| 6,650,707 B2 | 11/2003 | Youn et al. | |
| 6,760,482 B1 * | 7/2004 | Taubman | 382/240 |
| 6,826,228 B1 * | 11/2004 | Hui | 375/240.03 |
| 6,925,119 B2 * | 8/2005 | Bartolucci et al. | 375/240.03 |
| 7,042,943 B2 | 5/2006 | Haskell et al. | |
| 7,079,581 B2 | 7/2006 | Noh et al. | |
| 7,095,784 B2 * | 8/2006 | Chang et al. | 375/240.03 |
| 2001/0014121 A1 | 8/2001 | Kaye et al. | |
| 2003/0202580 A1 | 10/2003 | Noh et al. | |

(Continued)

FOREIGN PATENT DOCUMENTS

CN    1176562    3/1998

(Continued)

OTHER PUBLICATIONS

International Search Report, Mar. 20, 2006, Apple Computer, Inc.

(Continued)

*Primary Examiner* — Allen Wong
(74) *Attorney, Agent, or Firm* — Adeli & Tollen LLP

(57) ABSTRACT

Some embodiments of the invention encode a sequence of video images based on "visual masking" attributes of the video images and/or portions of the video images. Visual masking of an image or a portion of the image is an indication of how much coding artifacts can be tolerated in the image or image portion. To express the visual masking attribute of an image or an image portion, some embodiments compute a visual masking strength that quantifies the brightness energy of the image or the image portion. In some embodiments, the brightness energy is measured as a function of the average luma or pixel energy of the image or image portion.

35 Claims, 9 Drawing Sheets

U.S. PATENT DOCUMENTS

| | | |
|---|---|---|
| 2005/0169370 A1 | 8/2005 | Lee |
| 2006/0013298 A1 | 1/2006 | Tong et al. |
| 2006/0245492 A1 | 11/2006 | Pun et al. |

FOREIGN PATENT DOCUMENTS

| | | |
|---|---|---|
| EP | 0910212 A2 | 4/1999 |
| KR | 0305941 | 8/2001 |
| KR | 2003-0082818 | 10/2003 |
| TW | 545066 | 8/2003 |
| WO | PCT/US2005/022616 | 6/2005 |
| WO | WO 2006/004605 | 1/2006 |

OTHER PUBLICATIONS

Written Opinion of International Searching Authority, Mar. 20, 2006, Apple Computer, Inc.

International Preliminary Report on Patentability, Dec. 28, 2006, Apple Computer, Inc.

Atul Pun and R. Aravind, "Motion-compensated video coding with adaptive perceptual quantization," IEEE Trans. on Circuits and Systems for Video Technology, vol. 1, No. 4, pp. 351-361, Dec. 1991.

J. Lee and B.W. Dickinson, "Scene-adaptive motion interpolation structures based on temporal masking in human visual perception," in Proc. SPIE Conference on Visual Comm. and Image Processing, Cambridge, Month N/A 1993, pp. 499-510.

N. Jayant, J. Johnston, and R. Safranek, "Signal compression based on models of human perception," Proceedings fo IEEE, vol. 81, pp. 1385-1422, Oct. 1993.

Antonio Ortega, R. Ramchandran, and M. Vetterli, "Optimal trellis-based buffered compression and fast approximation," IEEE Trans. on Image Processing, vol. 3, pp. 26-40, Jan. 1994.

Jungwoo Lee and Bradley W. Dickinson, "Temporally adaptive motion interpolation exploiting temporal masking in visual perception," IEEE Trans. on Image Processing, vol. 3, No. 5, pp. 513-526, Sep. 1994.

Mark R. Pickering and John F. Arnold, "A perceptually efficient VBR rate control algorithm," IEEE Trans. on Image Processing, vol. 3, No. 5, pp. 527-532, Sep. 1994.

Chun-Hsien Chou and Y.-C Li, "A perceptually tuned subband image coder based on the measure of Just-Noticeable-Distortion profile," IEEE Trans. on Circuits and Systems for Video Technology, vol. 5, No. 6, pp. 467-476, Dec. 1995.

Wei Ding and B. Liu, "Rate control of MPEG video coding and recoding by Rate-Quantization modeling," IEEE Trans. on Circuits and Systems for Video Technology, vol. 6, No. 1, pp. 12-20, Feb. 1996.

Soon Hie Tan, Khee K. Pang, and K.N. Ngan, "Classified perceptual coding with adaptive quantization," IEEE Trans. on Circuits and Systems for Video Technology, vol. 6, No. 4, pp. 375-388, Aug. 1996.

Hirohisa Jozawa, K. Kamikura, A. Sagata, H. Kotera, and H. Watanabe, "Two-stage motion compensation using adaptive global MC and local affine MC," IEEE Trans. on Circuits and Systems for Video Tech., vol. 7, No. 1, pp. 75-82, Feb. 1997.

Wei Ding, "Joint encoder and channel rate control of VBR video over ATM networks," IEEE Trans. on Circuits and Systems for Video Technology, vol. 7, No. 2, pp. 266-278, Apr. 1997.

Kuo-Chin Fan and K.-S. Kan, "An active scene analysis-based approach for pseudoconstant bit-rate video coding," IEEE Trans. on Circuits and Systems for Video Technology, vol. 8, No. 2, pp. 159-170, Apr. 1998.

Antonio Ortega and R. Ramchandran, "Rate-Distortion methods for image and video compression," IEEE Signal Processing Magazine, vol. 15, No. 6, pp. 23-50, Nov. 1998.

Anthony Vetro, H. Sun, and Y. Wang, "MPEG-4 rate control for multiple video objects," IEEE Trans. on Circuits and Systems for Video Technology, vol. 9, No. 1, pp. 186-199, Feb. 1999.

Jordin Ribas-Corbera and S. Lei, "Rate control in DCT video coding for low-delay communications," IEEE Trans. on Circuits and Systems for Video Technology, vol. 9, No. 1, pp. 172-185, Feb. 1999.

Yi-Jen Chiu and Toby Berger, "A software-only videocodec using pixelwise conditional differential replenishment and perceptual enhancements," IEEE Trans. on Circuits and Systems for Video Technology, vol. 9, No. 3, pp. 438-450, Apr. 1999.

Austin Y. Lan, A.G. Nguyen, and J-N Hwang, "Scene-context-dependent reference-frame placement for MPEG video coding," IEEE Trans. on Circuits and Systems for Video Technology, vol. 9, No. 3, pp. 478-489, Apr. 1999.

L. Wang and A. Vincent, "Bit allocation and constraints for joint coding of multiple video programs," IEEE Trans. on Circuits and Systems for Video Technology, vol. 9, No. 6, Sep. 1999.

Jose I. Ronda, F. Jaureguizar, and N. Garcia, "Rate control and bit allocation for MPEG-4," IEEE Trans. on Circuits and Systems for Video Technology, vol. 9, No. 8, pp. 1243-1258, Dec. 1999.

Frederic Dufaux and J. Konrad, "Efficient, robust and fast global motion estimation for video coding," IEEE Trans. on Image Processing, vol. 9, No. 3, pp. 497-501, Mar. 2000.

Hung-Ju Lee, T. Chiang, and Y.-Q. Zhang, "Scalable rate control for MPEG-4 video," IEEE Trans. on Circuits and Systems for Video Technology, vol. 10, No. 6, pp. 878-894, Sep. 2000.

K.T. Tan and Mohammed Ghanbari, "A multi-metric objective picture-quality measurement model for MPEG video," IEEE Trans. on Circuits and Systems for Video Technology, vol. 10, No. 7, pp. 1208-1213, Oct. 2000.

Lila Boroczky, A.Y. Ngai, and E.F. Westermann, "Joint rate-control with look-ahead for multi-program video coding," IEEE Trans. on Circuits and Systems for Video Technology, vol. 10, No. 7, pp. 1159-1163, Oct. 2000.

I-Ming Pao and Ming-Ting Sun, "Encoding stored video for streaming applications," IEEE Trans. on Circuits and Systems for Video Technology, vol. 11, No. 2, pp. 199-209, Feb. 2001.

H. Song and C-C. Jay Kuo, "Rate control for low-bit-rate video via variable-encoding frame rates," IEEE Trans. on Circuits and Systems for Video Technology, vol. 11, No. 4, Apr. 2001.

Y. Yu, J. Zhou, Y. Wang, and C.W. Chen, "A novel two-pass VBR algorithm for fixed-size storage application," IEEE Trans. on Circuits and Systems for Video Technology, vol. 11, No. 3, Mar. 2001.

Supavadee Aramvith, I.-M. Pao, and M.-T. Sun, "A rate-control for video transport over wireless channels," IEEE Trans. on Circuits and Systems for Video Technology, vol. 11, No. 5, pp. 569-580, May 2001.

Yan Yang and S.S. Hemami, "Rate control for VBR video over ATM: Simplification and implementation," IEEE Trans. on Circuits and Systems for Video Technology, vol. 11, No. 9, pp. 1045-1058, Sep. 2001.

Zhihai He and S.K. Mitra, "Optimum bit allocation and accurate rate control for video coding via p-domain source modeling," IEEE Trans. on Circuits and Systems for Video Technology, vol. 12, No. 10, pp. 840-849, Oct. 2002.

Christophe De Vleeschouwer, T. Nilsson, K. Denolf, and J. Bormans, "Algorithmic and architectural co-design of a motion-estimation engine for low-power video devices," IEEE Trans. on Circuits and Systems for Video Technology, vol. 12, No. 12, pp. 1093-1105, Dec. 2002.

Ashish Jagmohan and K. Ratakonda, "MPEG-4 one-pass VBR rate control for digital storage," IEEE Trans. on Circuits and Systems for Video Technology, vol. 13, No. 5, pp. 447-452, May 2003.

Feng Pan, Z. Li, K. Lim, and G. Feng, "A study of MPEG-4 rate control scheme and its improvements," IEEE Trans. on Circuits and Systems for Video Technology, vol. 13, No. 5, pp. 440-446, May 2003.

Jeong-Woo Lee, A. Vetro, Y. Wang, and Y.-S. Ho, "Bit allocation for MPEG-4 video coding with spatio-temporal tradeoffs," IEEE Trans. on Circuits and Systems for Video Technology, vol. 13, No. 6, pp. 488-502, Jun. 2003.

Pol-Lin Tai, Shih-Yu Huang, C.T. Liu, and J.S. Wang, "Computation-aware scheme for software-based block motion estimation," IEEE Trans. on Circuits and Systems for Video Technology, vol. 13, No. 9, pp. 901-913, Sep. 2003.

Xiaodong Gu and Hongjiang Zhang, "Implementing dynamic GOP in video encoding," in IEEE Intl. Conference on Multimedia and Expo (ICME), Baltimore, Month N/A 2003, vol. 1, pp. 349-352.

Adriana Dumitras and Barry G. Haskell, "I/P/B frame type decision by collinearity of displacements," in Proceedings of IEEE Intl. Conference on Image Processing, Month N/A 2004. pp. 2769-2772.

Portions of prosecution history of U.S. Appl. No. 10/615,117, filed Oct. 27, 2005, Haskell, Barin Geoffry, et al.

Portions of prosecution history of U.S. Appl. No. 11/118,618, filed Sep. 10, 2010, Pun, Thomas, et al.

* cited by examiner

ENCODING WITH VISUAL MASKING

CLAIM OF BENEFIT

This application claims benefit of U.S. Provisional Patent Application 60/583,418, filed on Jun. 27, 2004. This application also claims benefit of U.S. Provisional Patent Application 60/643,918, filed on Jan. 9, 2005. These applications are incorporated herein by reference.

BACKGROUND OF THE INVENTION

Video encoders encode a sequence of video images (e.g., video frames) by using a variety of encoding schemes. Video encoding schemes typically encode video frames or portions of video frames (e.g., sets of pixels in the video frames) in terms of intraframes or interframes. An intraframe encoded frame or pixel set is one that is encoded independently of other frames or pixels sets in other frames. An interframe encoded frame or pixel set is one that is encoded by reference to one or more other frames or pixel sets in other frames.

When compressing video frames, some encoders implement a 'rate controller,' which provides a 'bit budget' for a video frame or a set of video frames that are to be encoded. The bit budget specifies the number of bits that have been allocated to encode the video frame or set of video frames. By efficiently allocating the bit budgets, the rate controller attempts to generate the highest quality compressed video stream in view of certain constraints (e.g., a target bit rate, etc.).

To date, a variety of single-pass and multi-pass rate controllers have been proposed. A single-pass rate controller provides bit budgets for an encoding scheme that encodes a series of video images in one pass, whereas a multi-pass rate controller provides bit budgets for an encoding scheme that encodes a series of video images in multiple passes.

Single-pass rate controllers are useful in real-time encoding situations. Multi-pass rate controllers, on the other hand, optimize the encoding for a particular bit rate based on a set of constraints. Not many rate controllers to date consider the spatial or temporal complexity of frames or pixel-sets within the frames in controlling the bit rates of their encodings. Also, most multi-pass rate controllers do not adequately search the solution space for encoding solutions that use optimal quantization parameters for frames and/or pixel sets within frames in view of a desired bit rate.

Therefore, there is a need in the art for a rate controller that uses novel techniques to consider the spatial or temporal complexity of video images and/or portions of video images, while controlling the bit rate for encoding a set of video images. There is also a need in the art for a multi-pass rate controller that adequately examines the encoding solutions to identify an encoding solution that uses an optimal set of quantization parameters for video images and/or portions of video images.

SUMMARY OF THE INVENTION

Some embodiments of the invention encode a sequence of video images based on "visual masking" attributes of the video images and/or portions of the video images. Visual masking of an image or a portion of the image is an indication of how much coding artifacts can be tolerated in the image or image portion. To express the visual masking attribute of an image or an image portion, some embodiments compute a visual masking strength that quantifies the brightness energy of the image or the image portion. In some embodiments, the brightness energy is measured as a function of the average luma or pixel energy of the image or image portion.

Instead of, or in conjunction with the brightness energy, the visual masking strength of an image or image portion might also quantify activity energy of the image or image portion. The activity energy expresses the complexity of the image or image portion. In some embodiments, the activity energy includes a spatial component that quantifies the spatial complexity of the image or image portion, and/or a motion component that quantifies the amount of distortion that can be tolerated/masked due to motion between images.

Some embodiments of the invention provide a method for encoding video sequences. The method identifies a visual-masking attribute of a first image in the video. It also identifies a quantization parameter for encoding the first image based on the identified visual-masking attribute. The method then encodes the first image based on the identified quantization parameter.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
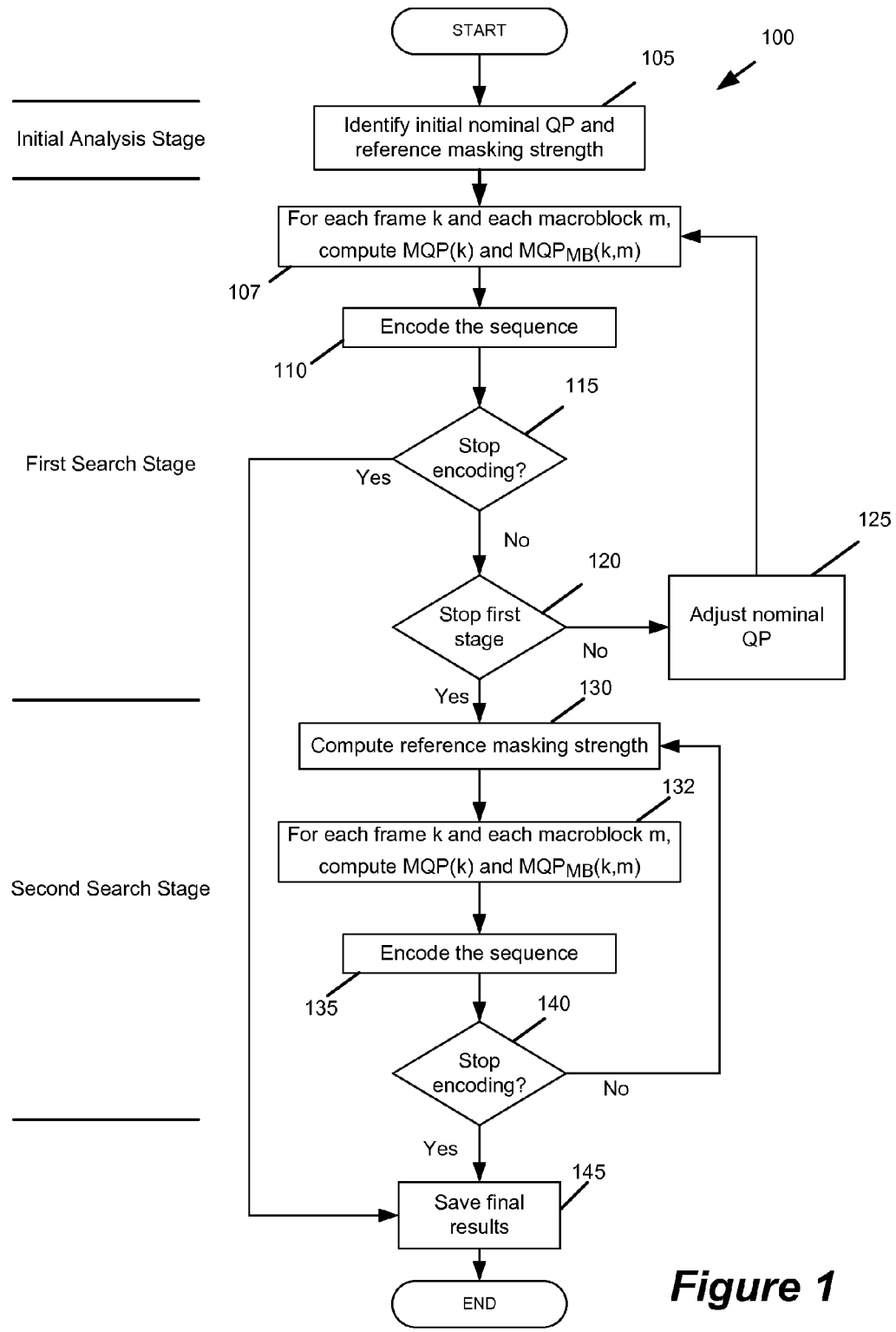
FIG. 1 presents a process that conceptually illustrates the encoding method of some embodiments of the invention.

In the following detailed description of the invention, numerous details, examples and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of encoding a sequence of video images based on "visual masking" attributes of the video images and/or portions of the video images. Visual masking of an image or a portion of the image is an indication of how much coding artifacts can be tolerated in the image or image portion. The invention's use of visual masking is based on the realization that coding artifacts (noise) in brighter or complex areas of an image or image portion are less visible than those in darker or flat areas of the image or image portion.

In the discussion below, each video image is a video frame, and each image portion is a macroblock within the video frame. One of ordinary skill will realize that in some embodiments the video images are not frames (e.g., the video images are fields, etc.) and the image portions are not macroblocks (e.g., the image portions are partitions of macroblocks, etc.).

To express the visual masking attribute of a frame or a macroblock, some embodiments compute a visual masking strength that quantifies the brightness energy of the frame or the macroblock. In some embodiments, the brightness energy is measured as a function of the average luma or pixel energy of the frame or macroblock.

Instead of, or in conjunction with the brightness energy, the visual masking strength of a frame or macroblock might also quantify activity energy of the frame or macroblock. The activity energy expresses the complexity of the frame or maroblock. In some embodiments, the activity energy includes a spatial component and/or a motion component. In some embodiments, the spatial activity energy is calculated as a function of the differences in the pixel values of the frame or macroblock. The more pixel values differ from each other in the frame or macroblock, the more spatial energy the frame or macroblock has.

In some embodiments, the motion activity component (also called temporal activity) quantifies the amount of distortion that can be tolerated/masked due to motion between frames. In some embodiments, this motion activity component is calculated as a function of the motion compensated error signal of pixel regions defined within the frame. In other embodiments, this motion activity is calculated as a function of the motion compensated error signal of pixel regions defined within the current frame, a set of frames before the current frame, and/or a set of frames after the current frame.

I. Definitions

This section provides definitions for several symbols that are used in this document.

$R_T$ represents a target bit rate, which is a desired bit rate for encoding a sequence of frames. Typically, this bit rate is expressed in units of bit/second, and is calculated from the desired final file size, the number of frames in the sequence, and the frame rate.

$R_p$ represents the bit rate of the encoded bit stream at the end of a pass p.

$E_p$ represents the percentage of error in the bit rate at the end of pass p. In some cases, this percentage is calculated as $$100 \times \frac{(R_T - R_P)}{R_T}.$$

$\epsilon$ represents the error tolerance in the final bit rate.

$\epsilon_C$ represents the error tolerance in the bit rate for the first QP search stage.

QP represents the quantization parameter.

$QP_{Nom(p)}$ represents the nominal quantization parameter that is used in pass p encoding for a sequence of frames. The value of $QP_{Nom(p)}$ is adjusted by the invention's multi-pass encoder in a first QP adjustment stage to reach the target bit rate.

$MQP_p(k)$ represents the masked frame QP, which is the quantization parameter (QP) for a frame k in pass p. Some embodiments compute this value by using the nominal QP and frame-level visual masking.

$MQP_{MB(p)}(k, m)$ represents the masked macroblock QP, which is the quantization parameter (QP) for an individual macroblock (with a macroblock index m) in a frame k and a pass p. Some embodiments compute $MQP_{MB(p)}(k, m)$ by using $MQP_p(k)$ and macroblock-level visual masking.

$\phi_F(k)$ represents a value referred to as the masking strength for frame k. The masking strength $\phi_F(k)$ is a measure of complexity for the frame and, in some embodiments, this value is used to determine how visible coding artifacts/noise would appear and to compute the $MQP_p(k)$ of frame k.

$\phi_{R(p)}$ represents the reference masking strength in pass p. The reference masking strength is used to compute $MQP_p(k)$ of frame k, and it is adjusted by the invention's multi-pass encoder in a second stage to reach the target bit rate.

$\phi_{MB}(k, m)$ represents the masking strength for a macroblock with an index m in frame k. The masking strength $\phi_{MB}(k, m)$ is a measure of complexity for the macroblock and, in some embodiments, it is used to determine how visible coding artifacts/noise would appear and to compute $MQP_{MB(p)}(k, m)$. $AMQP_p$ represents an average masked QP over frames in pass p. In some embodiments, this value is computed as the average $MQP_p(k)$ over all frames in a pass p.

II. Overview

Some embodiments of the invention provide an encoding method that achieves the best visual quality for encoding a sequence of frames at a given bit rate. In some embodiments, this method uses a visual masking process that assigns a quantization parameter QP to every macroblock. This assignment is based on the realization that coding artifacts/noise in brighter or spatially complex areas in an image or a video frame are less visible than those in darker or flat areas.

In some embodiments, this visual masking process is performed as part of an inventive multi-pass encoding process. This encoding process adjusts a nominal quantization parameter and controls the visual masking process through a reference masking strength parameter $\phi_R$, in order to have the final encoded bit stream reach the target bit rate. As further described below, adjusting the nominal quantization parameter and controlling the masking algorithm adjust the QP values for each picture (i.e., each frame in typically video encoding schemes) and each macroblock within each picture.

In some embodiments, the multi-pass encoding process globally adjusts the nominal QP and $\phi_R$ for the entire sequence. In other embodiments, this process divides the video sequence into segments, with the nominal QP and $\phi_R$ adjusted for each segment. The description below refers to a sequence of frames on which the multi-pass encoding process is employed. One of ordinary skill will realize that this sequence includes the entire sequence in some embodiments, while it includes only a segment of a sequence in other embodiments.

In some embodiments, the method has three stages of encoding. These three stages are: (1) an initial analysis stage that is performed in pass 0, (2) a first search stage that is performed in pass 1 through pass $N_1$, and (3) a second search stage that is performed in pass $N_1+1$ through $N_1+N_2$.

In the initial analysis stage (i.e., during pass 0), the method identifies an initial value for the nominal QP ($QP_{Nom(1)}$, to be used in pass 1 of the encoding). During the initial analysis stage, the method also identifies a value of the reference masking strength $\phi_R$, which is used in all the passes in first search stage.

In first search stage, the method performs $N_1$ iterations (i.e., $N_1$ passes) of an encoding process. For each frame k during each pass p, the process encodes the frame by using a particular quantization parameter $MQP_p(k)$ and particular quantization parameters $MQP_{MB(p)}(k, m)$ for individual macroblocks m within the frame k, where $MQP_{MB(p)}(k, m)$ is computed using $MQP_p(k)$.

In the first search stage, the quantization parameter $MQP_p(k)$ changes between passes as it is derived from a nominal quantization parameter $QP_{Nom(p)}$ that changes between passes. In other words, at the end of each pass p during the first search stage, the process computes a nominal $QP_{Nom(p+1)}$ for pass p+1. In some embodiments, the nominal $QP_{Nom(p+1)}$ is based on the nominal QP value(s) and bit rate error(s) from previous pass(es). In other embodiments, the nominal $QP_{Nom(p+1)}$ value is computed differently at the end of each pass in the second search stage.

In the second search stage, the method performs $N_2$ iterations (i.e., $N_2$ passes) of the encoding process. As in the first search stage, the process encodes each frame k during each pass p by using a particular quantization parameter $MQP_p(k)$ and particular quantization parameters $MQP_{MB(p)}(k, m)$ for individual macroblocks m within the frame k, where $MQP_{MB(p)}(k, m)$ is derived from $MQP_p(k)$.

Also, as in the first search stage, the quantization parameter $MQP_p(k)$ changes between passes. However, during the second search stage, this parameter changes as it is computed using a reference masking strength $\phi_{R(p)}$ that changes between passes. In some embodiments, the reference masking strength $\phi_{(R(p)}$ is computed based on the error in bit rate(s) and value(s) of $\phi_R$ from previous pass(es). In other embodiments, this reference masking strength is computed to be a different value at the end of each pass in the second search stage.

Although the multi-pass encoding process is described in conjunction with the visual masking process, one of ordinary skill in art will realize that an encoder does not need to use both these processes together. For instance, in some embodiments, the multi-pass encoding process is used to encode a bitstream near a given target bit rate without visual masking, by ignoring $\phi_R$ and omitting the second search stage described above.

The visual masking and multi-pass encoding process are further described in Sections III and IV of this application.

III. Visual Masking

Given a nominal quantization parameter, the visual masking process first computes a masked frame quantization parameter (MQP) for each frame using the reference masking strength ($\phi_R$) and the frame masking strength ($\phi_F$). This process then computes a masked macroblock quantization parameter ($MQP_{MB}$) for each macroblock, based on the frame and macroblock-level masking strengths ($\phi_F$ and $\phi_{MB}$). When the visual masking process is employed in a multi-pass encoding process, the reference masking strength ($\phi_R$) in some embodiments is identified during the first encoding pass, as mentioned above and further described below.

A. Computing the Frame-Level Masking Strength

1. First Approach

To compute the frame-level masking strength $\phi_F(k)$, some embodiments use the following equation (A):

$$\phi_F(k) = C * \text{power}(E * \text{avgFrameLuma}(k), \beta) * \text{power}(D * \text{avgFrameSAD}(k), \alpha_F), \quad (A)$$

where avgFrameLuma(k) is the average pixel intensity in frame k computed using b×b regions, where b is an integer greater or equal to 1 (for instance, b=1 or b=4);

avgFrameSAD(k) is the average of MbSAD(k, m) over all macroblocks in frame k;

MbSAD(k, m) is the sum of the values given by a function Calc4×4MeanRemovedSAD(4×4_block_pixel_values) for all 4×4 blocks in the macroblock with index m;

$\alpha_F$, C, D, and E are constants and/or are adapted to the local statistics; and power(a,b) means $a^b$.

The pseudo-code for the function Calc4×4MeanRemovedSAD is as follows:

```
Calc4×4MeanRemovedSAD(4×4_block_pixel_values)
{
    calculate the mean of pixel values in the given 4×4 block;
    subtract the mean from pixel values and compute their absolute values;
    sum the absolute values obtained in the previous step;
    return the sum;
}
```

2. Second Approach

Other embodiments compute the frame-level masking strength differently. For instance, the above-described equation (A) computes the frame masking strength essentially as follows:

$$\phi_F(k) = C * \text{power}(E * \text{Brightness\_Attribute}, \text{exponent0}) * \text{power}(\text{scalar} * \text{Spatial\_Activity\_Attribute}, \text{exponent1}).$$

In equation (A), the frame's Brightness_Attribute equals avgFrameLuma(k), and the Spatial_Activity_Attribute equals avgFrameSAD(k), which is the average macroblock SAD (MbSAD(k, m)) value over all macroblocks in a frame, where the average macroblock SAD equals the sum of the absolute value of the mean removed 4×4 pixel variation (as given by Calc4×4MeanRemovedSAD) for all 4×4 blocks in a macroblock. This Spatial_Activity_Attribute measures the amount of spatial innovations in a region of pixels within the frame that is being coded.

Other embodiments expand the activity measure to include the amount of temporal innovations in a region of pixels across a number of successive frames. Specifically, these embodiments compute the frame masking strength as follows:

$$\phi_F(k) = C * \text{power}(E * \text{Brightness\_Attribute}, \text{exponent0}) * \text{power}(\text{scalar} * \text{Activity\_Attribute}, \text{exponent1}) \quad (B)$$

In this equation, the Activity_Attribute is given by the following equation (C), $$\text{Activity\_Attribute} = G * \text{power}(D * \text{Spatial\_Activity\_Attribute}, \text{exponent\_beta}) + E * \text{power}(F * \text{Temporal\_Activity\_Attribue}, \text{exponent\_delta}) \quad (C)$$

In some embodiments, the Temporal_Activity_Attribute quantifies the amount of distortion that can be tolerated (i.e., masked) due to motion between frames. In some of these embodiments, the Temporal_Activity_Attribute of a frame equals a constant times the sum of the absolute value of the motion compensated error signal of pixel regions defined within the frame. In other embodiments, Temporal_Activity_Attribute is provided by the equation (D) below:

$$\text{Temporal\_Activity\_Attribute} = \sum_{j=-1}^{-N} (W_j \cdot avgFrameSAD(j)) + \sum_{j=1}^{M} (W_j \cdot avgFrameSAD(j)) + W_0 \cdot avgFrameSAD(0) \quad (D)$$

In equation (D), "avgFrameSAD" expresses (as described above) the average macroblock SAD (MbSAD(k, m)) value in a frame, avgFrameSAD(0) is the avgFrameSAD for the current frame, and negative j indexes time instances before the current and positive j indexes time instances after the current frame. Hence, avgFrameSAD(j=−2) expresses the average frame SAD of two frames before the current frame, avgFrameSAD(j=3) expresses the average frame SAD of three frames after the current frame.

Also, in equation (D), the variables N and M refer to the number of frames that are respectively before and after the current frame. Instead of simply selecting the values N and M based on particular number of frames, some embodiments compute the values N and M based on the particular durations of time before and after the time of the current frame. Correlating the motion masking to temporal durations is more advantageous than correlating the motion masking to a set number of frames. This is because the correlation of the motion masking with the temporal durations is directly in line with the viewer's time-based visual perception. The correlation of such masking with the number of frames, on the other hand, suffers from a variable display duration as different displays present video at different frame rates.

In equation (D), "W" refers to a weighting factor, which, in some embodiment, decreases as the frame j gets further from the current frame. Also, in this equation, the first summation expresses the amount of motion that can be masked before the current frame, the second summation expresses the amount of motion that can be masked after the current frame, and the last expression (avgFrameSAD(0)) expresses the frame SAD of the current frame.

In some embodiments, the weighting factors are adjusted to account for scene changes. For instance, some embodiments account for an upcoming scene change within the look ahead range (i.e., within the M frames) but not any frames after a scene change. For instance, these embodiments might set the weighting factors to zero for frames within the look ahead range that are after a scene change. Also, some embodiments do not account for frames prior to or on a scene change within the look behind range (i.e., within the N frames). For instance, these embodiments might set the weighting factors to zero for frames within the look behind range that relate to a previous scene or fall before the previous scene change.

3. Variations to the Second Approach a) Limiting the Influence of Past and Future Frames on the Temporal_Activity_Attribute Equation (D) above essentially expresses the Temporal_Activity_Attribute in the following terms:

Temporal_Activity_Attribute = Past_Frame_Activity +

Future_Frame_Activity + Current_Frame_Activity, where Past_Frame_Activity (PFA) equals $$\sum_{i=1}^{N} (W_i \cdot avgFrameSAD(i)),$$

Future_Frame_Activity (FFA) equals $$\sum_{j=1}^{M} (W_j \cdot avgFrameSAD(j)),$$

and Current_Frame_Activity (CFA) equals avgFrameSAD (current).

Some embodiments modify the calculation of the Temporal_Activity_Attribute so that neither the Past_Frame_Activity nor the Future_Frame_Activity unduly controls the value of the Temporal_Activity_Attribute. For instance, some embodiments initially define PFA to equal $$\sum_{i=1}^{N} (W_i \cdot avgFrameSAD(i)),$$

and FFA to equal $$\sum_{j=1}^{M} (W_j \cdot avgFrameSAD(j)).$$

These embodiments then determine whether PFA is bigger than a scalar times FFA. If so, these embodiments then set PFA equal to an upper PFA limit value (e.g., a scalar times FFA). In addition to setting PFA equal to an upper PFA limit value, some embodiments may perform a combination of setting FFA to zero and setting CFA to zero. Other embodiments might set either of or both of PFA and CFA to a weighted combination of PFA, CFA, and FFA.

Analogously, after initially defining the PFA and FFA values based on the weighted sums, some embodiments also determine whether FFA value is bigger than a scalar times PFA. If so, these embodiments then set FFA equal to an upper FFA limit value (e.g., a scalar times PFA).). In addition to setting FFA equal to an upper FFA limit value, some embodiments may perform a combination of setting PFA to zero and setting CFA to zero. Other embodiments may set either of or both of FFA and CFA to a weighted combination of FFA, CFA, and PFA.

The potential subsequent adjustment of the PFA and FFA values (after the initial computation of these values based on the weighted sums) prevent either of these values from unduly controlling the Temporal_Activity_Attribute.

b) Limiting the Influence of Spatial_Activity_Attribute and Temporal_Activity_Attribute on the Activity_Attribute Equation (C) above essentially expresses the Activity_Attribute in the following terms:

Activity_Attribute = Spatial_Activity + Temporal_Activity, where the Spatial_Activity equals a scalar*(scalar*Spatial_Activity_Attribute)$^\beta$, and Temporal_Activity equals a scalar*(scalar*Temporal_Activity_Attribute)$^\Delta$.

Some embodiments modify the calculation of the Activity_Attribute so that neither the Spatial_Activity nor the Temporal_Activity unduly controls the value of the Activity_Attribute. For instance, some embodiments initially define the Spatial_Activity (SA) to equal a scalar*(scalar*Spatial_Activity_Attribute)$^\beta$, and define the Temporal_Activity (TA) to equal a scalar*(scalar*Temporal_Activity_Attribute)$^\Delta$.

These embodiments then determine whether SA is bigger than a scalar times TA. If so, these embodiments then set SA equal to an upper SA limit value (e.g., a scalar times TA). In addition to setting SA equal to an upper SA limit in such a case, some embodiments might also set the TA value to zero or to a weighted combination of TA and SA.

Analogously, after initially defining the SA and TA values based on the exponential equations, some embodiments also determine whether TA value is bigger than a scalar times SA.

If so, these embodiments then set TA equal to an upper TA limit value (e.g., a scalar times SA). In addition to setting TA equal to an upper TA limit in such a case, some embodiments might also set the SA value to zero or to a weighted combination of SA and TA.

The potential subsequent adjustment of the SA and TA values (after the initial computation of these values based on the exponential equations) prevent either of these values from unduly controlling the Activity_Attribute.

B. Computing the Macroblock-Level Masking Strength

1. First Approach

In some embodiments, the macroblock-level masking strength $\phi_{MB}(k, m)$ is calculated as follows:

$$\phi_{MB}(k, m) = A^* \text{power}(C^* \text{avgMbLuma}(k,m), \beta)^* \text{power}(B^* \text{MbSAD}(k, m), \alpha_{MB}), \quad (F)$$

where
avgMbLuma(k, m) is the average pixel intensity in frame k, macroblock m;
$\alpha_{MB}, \beta, A, B,$ and C are constants and/or are adapted to the local statistics.

2. Second Approach

The above-described equation (F) computes the macroblock masking strength essentially as follows:

$$\phi_{MB}(k,m) = D^* \text{power}(E^* \text{Mb\_Brightness\_Attribute}, \text{exponent0})^* \text{power}(\text{scalar}^* \text{Mb\_Spatial\_Activity\_Attribute}, \text{exponent1}).$$

In equation (F), the macroblock's Mb_Brightness_Attribute equals avgMbLuma(k,m), and Mb_Spatial_Activity_Attribute equals avgMbSAD(k). This Mb_Spatial_Activity_Attribute measures the amount of spatial innovations in a region of pixels within the macroblock that is being coded.

Just as in the case of the frame masking strength, some embodiments might expand the activity measure in the macroblock masking strength to include the amount of temporal innovations in a region of pixels across a number of successive frames. Specifically, these embodiments would compute the macroblock masking strength as follows:

$$\phi_{MB}(k,m) = D^* \text{power}(E^* \text{Mb\_Brightness\_Attribute}, \text{exponent0})^* \text{power}(\text{scalar}^* \text{Mb\_Activity\_Attribute}, \text{exponent1}), \quad (G)$$

where the Mb_Activity_Attribute is given by the following equation (H), $$\text{Mb\_Activity\_Attribute} = F^* \text{power}(D^* \text{Mb\_Spatial\_Activity\_Attribute}, \text{exponent\_beta}) + G^* \text{power}(F^* \text{Mb\_Temporal\_Activity\_Attribue}, \text{exponent\_delta}) \quad (H)$$

The computation of the Mb_Temporal_Activity_Attribute for a macroblock can be analogous to the above-described computation of the Mb_Temporal_Activity_Attribute for a frame. For instance, in some of these embodiments, the Mb_Temporal_Activity_Attribute is provided by the equation (I) below:

$$\text{Mb\_Temporal\_Activity\_Attribute} = \sum_{i=1}^{N}(W_i \cdot \text{MbSAD}(i,m)) + \sum_{j=1}^{M}(W_j \cdot \text{MbSAD}(j,m)) + \text{MbSAD}(m) \quad (I)$$

The variables in the equation (I) were defined in Section III.A. In equation (F), the macroblock m in frame i or j can be the macroblock in the same location as the macroblock m in the current frame, or can be the macroblock in frame i or j that is initially predicted to correspond the macroblock m in the current frame.

The Mb_Temporal_Activity_Attribute provided by equation (I) can be modified in an analogous manner to the modifications (discussed in Section III.A.3 above) of the frame Temporal_Activity_Attribute provided by equation (D). Specifically, the Mb_Temporal_Activity_Attribute provided by the equation (I) can be modified to limit the undue influence of macroblocks in the past and future frames.

Similarly, the Mb_Activity_Attribute provided by equation (H) can be modified in an analogous manner to the modifications (discussed in Section III.A.3 above) of the frame Activity_Attribute provided by equation (C). Specifically, the Mb_Activity_Attribute provided by equation (H) can be modified to limit the undue influence of the Mb_Spatial_Activity_Attribute and the Mb_Temporal_Activity_Attribute.

C. Computing the Masked QP Values

Based on the values of masking strengths ($\phi_F$ and $\phi_{MB}$) and the value of the reference masking strength ($\phi_R$), the visual masking process can calculate the masked QP values at the frame level and macroblock level by using two functions CalcMQP and CalcMQPforMB. The pseudo code for these two functions is below:

```
CalcMQP(nominalQP, φ_R, φ_F(k), maxQPFrameAdjustment)
{
    QPFrameAdjustment = β_F *(φ_F(k) – φ_R) / φ_R;
    clip QPFrameAdjustment to lie within [minQPFrameAdjustment,, maxQPFrameAdjustment];
    maskedQPofFrame = nominalQP + QPFrameAdjustment;
    clip maskedQPofFrame to lie in the admissible range;
    return maskedQPofFrame (for frame k);
}
CalcMQPforMB(maskedQPofFrame, φ_F(k), φ_MB(k, m), maxQPMacroblockAdjustment)
{
    if (φ_F(k) >T)          where T is a suitably chosen threshold
        QPMacroblockAdjustment= β_MB * (φ_MB(k, m) – φ_F(k)) / φ_F(k);
    else
        QPMacroblockAdjustment= 0;
    clip QPMacroblockAdjustment so that it lies within [minQPMacroblockAdjustment, maxQPMacroblockAdjustment ];
    maskedQPofMacroblock = maskedQPofFrame + QPMacroblockAdjustment;
    clip maskedQPofMacroblock so that it lies within the valid QP value range;
    return maskedQPofMacroblock;
}
```

In the above functions, $\beta_F$ and $\beta_{MB}$ can be predetermined constants or adapted to local statistics.

IV. Multi-Pass Encoding

FIG. 1 presents a process 100 that conceptually illustrates the multi-pass encoding method of some embodiments of the invention. As shown in this figure, the process 100 has three stages, which are described in the following three sub-sections.

A. Analysis and Initial QP Selection

As shown in FIG. 1, the process 100 initially computes (at 105) the initial value of the reference masking strength ($\phi_{R(1)}$) and the initial value of the nominal quantization parameter ($QP_{Nom(1)}$) during the initial analysis stage (i.e., during pass 0) of the multi-pass encoding process. The initial reference masking strength ($\phi_{R(1)}$) is used during the first search stage, while the initial nominal quantization parameter ($QP_{Nom(1)}$)

is used during the first pass of the first search stage (i.e., during pass 1 of the multi-pass encoding process).

At the beginning of pass 0, $\phi_{R(0)}$ can be some arbitrary value or a value selected based on experimental results (for instance, the middle value of a typical range of $\phi_R$ values). During an analysis of the sequence, a masking strength $\phi_F(k)$ is computed for each frame, then the reference masking strength, $\phi_{R(1)}$, is set to be equal to $avg(\phi_F(k))$ at the end of pass 0. Other decisions for the reference masking strength $\phi_R$ are also possible. For instance, it may be computed as the median or other arithmetic function of the values $\phi_F(k)$, e.g., a weighted average of the values $\phi_F(k)$.

There are several approaches to initial QP selection with varying complexity. For instance, the initial nominal QP can be selected as an arbitrary value (e.g., 26). Alternatively, a value can be selected that is known to produce an acceptable quality for the target bit rate based on coding experiments.

The initial nominal QP value can also be selected from a look-up table based on spatial resolution, frame rate, spatial/temporal complexity, and target bit rate. In some embodiments, this initial nominal QP value is selected from the table using a distance measure that depends on each of these parameters, or it may be selected using a weighted distance measure of these parameters.

This initial nominal QP value can also be set to the adjusted average of the frame QP values as they are selected during a fast encoding with a rate controller (without masking), where the average has been adjusted based on the bit rate percentage rate error $E_0$ for pass 0. Similarly, the initial nominal QP can also be set to a weighted adjusted average of the frame QP values, where the weight for each frame is determined by the percentage of macroblocks in this frame that are not coded as skipped macroblocks. Alternatively, the initial nominal QP can be set to an adjusted average or an adjusted weighted average of the frame QP values as they are selected during a fast encoding with a rate controller (with masking), as long as the effect of changing the reference masking strength from $\phi_{R(0)}$ to $\phi_{R(1)}$ is taken into account.

B. First Search Stage: Nominal QP Adjustments

After 105, the multi-pass encoding process 100 enters the first search stage. In first search stage, the process 100 performs $N_1$ encodings of the sequence, where $N_1$ represents the number of passes through the first search stage. During each pass of the first stage, the process uses a changing nominal quantization parameter with a constant reference masking strength.

Specifically, during each pass p in the first search stage, the process 100 computes (at 107) a particular quantization parameter $MQP_p(k)$ for each frame k and a particular quantization parameter $MQP_{MB(p)}(k, m)$ for each individual macroblock m within the frame k. The calculation of the parameters $MQP_p(k)$ and $MQP_{MB(p)}(k, m)$ for a given nominal quantization parameter $QP_{Nom(p)}$ and reference masking strength $\phi_{R(p)}$ was described in Section III. In the first pass (i.e., pass 1) through 107, the nominal quantization parameter and the first-stage reference masking strength are parameter $QP_{Nom(1)}$ and reference masking strength $\phi_{R(1)}$, which were computed during the initial analysis stage 105.

After 107, the process encodes (at 110) the sequence based on the quantization parameter values computed at 107. Next, the encoding process 100 determines (at 115) whether it should terminate. Different embodiments have different criteria for terminating the overall encoding process. Examples of exit conditions that completely terminate the multi-pass encoding process include:

$|E_p|<\epsilon$, where $\epsilon$ is the error tolerance in the final bit rate.
$QP_{Nom(p)}$ is at the upper or lower bound of the valid range of QP values.
The number of passes has exceeded the maximum number of allowable passes $P_{MAX}$.

Some embodiments might use all of these exit conditions, while other embodiments might only use some of them. Yet other embodiments might use other exit conditions for terminating the encoding process.

When the multi-pass encoding process decides (at 115) to terminate, the process 100 omits the second search stage and transitions to 145. At 145, the process saves the bitstream from the last pass p as the final result, and then terminates.

On the other hand, when the process determines (at 115) that it should not terminate, it then determines (at 120) whether it should terminate the first search stage. Again, different embodiments have different criteria for terminating the first search stage. Examples of exit conditions that terminate the first search stage of the multi-pass encoding process include:

$QP_{Nom(p+1)}$ is the same as $QP_{Nom(q)}$, and $q \leq p$, (in this case, the error in bit rate cannot be lowered any further by modifying the nominal QP).
$|E_p|<\epsilon_C$, $\epsilon_C > \epsilon$, where $\epsilon_C$ is the error tolerance in the bit rate for the first search stage.
The number of passes has exceeded $P_1$, where $P_1$ is less than $P_{MAX}$.
The number of passes has exceeded $P_2$, which is less than $P_1$, and $|E_p|<\epsilon_2$, $\epsilon_2 > \epsilon_C$.

Some embodiments might use all these exit conditions, while other embodiments might only use some of them. Yet other embodiments might use other exit conditions for terminating the first search stage.

When the multi-pass encoding process decides (at 120) to terminate the first search stage, the process 100 proceeds to the second search stage, which is described in the next subsection. On the other hand, when the process determines (at 120) that it should not terminate the first search stage, it updates (at 125) the nominal QP for the next pass in the first search stage (i.e., defines $QP_{Nom(p+1)}$). In some embodiments, the nominal $QP_{Nom(p+1)}$ is updated as follows. At the end of pass 1, these embodiments define $$QP_{Nom(p+1)} = QP_{Nom(p)} + \chi E_p,$$

where $\chi$ is a constant. At the end of each pass from pass 2 to pass $N_1$, these embodiments then define $$QP_{Nom(p+1)} = \text{InterpExtrap}(0, E_{q1}, E_{q2}, QP_{Nom(q1)}, QP_{Nom(q2)}),$$

where InterpExtrap is a function that is further described below. Also, in the above equation, q1 and q2 are pass numbers with corresponding bit rate errors that are the lowest among all passes up to pass p, and q1, q2, and p have the following relationship:

$$1 \leq q1 < q2 \leq p.$$

Below is the pseudo code for the InterpExtrap function. Note that if x is not between x1 and x2, this function is an extrapolation function. Otherwise, it is an interpolation function.

```
InterpExtrap(x, x1, x2, y1, y2)
{
    if (x2 != x1) y = y1 + (x - x1) * (y2 - y1)/(x2 - x1);
    else y = y1;
    return y;
}
```

The nominal QP value is typically rounded to an integer value and clipped to lie within the valid range of QP values. One of ordinary skill in art will realize that other embodiments might compute the nominal $QP_{Nom(p+1)}$ value differently than the approached described above.

After 125, the process transitions back to 107 to start the next pass (i.e., p:=p+1), and for this pass, compute (at 107) a particular quantization parameter $MQP_p(k)$ for each frame k and a particular quantization parameter $MQP_{MB(p)}(k, m)$ for each individual macroblock m within the frame k for the current pass p. Next, the process encodes (at 110) the sequence of frames based on these newly computed quantization parameters. From 110, the process then transitions to 115, which was described above.

C. Second Search Stage: Reference Masking Strength Adjustments

When the process 100 determines (at 120) that it should terminate the first search stage, it transitions to 130. In the second search stage, the process 100 performs $N_2$ encodings of the sequence, where $N_2$ represents the number of passes through the second search stage. During each pass, the process uses the same nominal quantization parameter and a changing reference masking strength.

At 130, the process 100 computes a reference masking strength $\phi_{R(p+1)}$ for the next pass, i.e., pass p+1, which is pass $N_1+1$. In pass $N_1+1$, the process 100 encodes the sequence of frames in 135. Different embodiments compute (at 130) the reference masking strength $\phi_{R(p+1)}$ at the end of a pass p in different ways. Two alternative approaches are described below.

Some embodiments compute the reference masking strength $\phi_{R(p)}$ based on the error in bit rate(s) and value(s) of $\phi_R$ from previous pass(es). For instance, at the end of pass $N_1$, some embodiments define $$\phi_{R(N1+1)} = \phi_{R(N1)} + \phi R(N1) \times Konst \times E_{N1}.$$

At the end of pass $N_1+m$, where m is an integer greater than 1, some embodiments define $$\phi_{R(N1+m)} = \text{InterpExtrap}(0, E_{N1+m-2}, E_{N1+m-1}, \phi_{R(N1+m-2)}, \phi_{R(N1+m-1)}).$$

Alternatively, some embodiments define $$\phi_{R(N1+m)} = \text{InterpExtrap}(0, E_{N1+m-q2}, E_{N1+m-q1}, \phi_{R(N1+m-q2)}, \phi_{R(N1+m-q1)}),$$

where q1 and q2 are previous passes that gave the best errors.

Other embodiments compute the reference masking strength at the end of each pass in the second search stage by using AMQP, which was defined in Section I. One way for computing AMQP for a given nominal QP and some value for $\phi_R$ will be described below by reference to the pseudo code of a function GetAvgMaskedQP.

```
GetAvgMaskedQP(nominalQP, φ_R)
{
  sum=0;
  for(k=0;k<numframes;k++) {
    MQP(k) = maskedQP for frame k calculated using
    CalcMQP(nominalQP, φ_R, φ_F(k), maxQPFrameAdjustment);
    // see above
    sum += MQP(k);
  }
  return sum/numframes;
}
```

Some embodiments that use AMQP, compute a desired AMQP for pass p+1 based on the error in bit rate(s) and value(s) of AMQP from previous pass(es). The $\phi_{R(p+1)}$ corresponding to this AMQP is then found through a search procedure given by a function Search($AMQP_{(p+1)}$, $\phi_{R(p)}$), the pseudo code of which is given at the end of this subsection.

For instance, some embodiments at the end of pass $N_1$ compute $AMQP_{N1+1}$, where $$AMQP_{N1+1} = \text{InterpExtrap}(0, E_{N1-1}, E_{N1}, AMQP_{N1-1}, AMQP_{N1}), \text{ when } N_1>1, \text{ and } AMQP_{N1+1} = AMQP_{N1}, \text{ when } N_1=1,$$

These embodiments then define:

$$\phi_{R(N1+1)} = \text{Search}(AMQP_{N1+1}, \phi_{R(N1)})$$

At the end of pass $N_1+m$ (where m is an integer greater than 1), some embodiments define:

$$AMQP_{N1+m} = \text{InterpExtrap}(0, E_{N1+m-2}, E_{N1+m-1}, AMQP_{N1+m-2}, AMQP_{N1+m-1}), \text{ and}$$

$$\phi_{R(N1+m)} = \text{Search}(AMQP_{N1+m}, \phi_{R(N1+m-1)})$$

Given the desired AMQP and some default value of $\phi_R$, the $\phi_R$ corresponding to the desired AMQP can be found using the Search function, which has the following pseudo code in some embodiments:

```
Search(AMQP, φ_R)
{
  interpolateSuccess=True;  //until set otherwise
  refLumaSad0=refLumaSad1=refLumaSadx=φ_R;
  errorInAvgMaskedQp =
  GetAvgMaskedQp(nominalQp, refLumaSadx) - AMQP;
  if(errorInAvgMaskedQp>0){
    ntimes=0;
    do{
      ntimes++;
      refLumaSad0 = (refLumaSad0 * 1.1);
      errorInAvgMaskedQp =
      GetAvgMaskedQp(nominalQp,refLumaSad0) - amqp;
    }while(errorInAvgMaskedQp>0 && ntimes<10);
    if(ntimes>=10)interpolateSuccess=False;
  }
  else{ //errorInAvgMaskedQp<0
    ntimes=0;
    do{
      ntimes++;
      refLumaSad1 = (refLumaSad1 * 0.9);
      errorInAvgMaskedQp =
      GetAvgMaskedQp(nominalQp,refLumaSad1) - amqp;
    }while(errorInAvgMaskedQp<0 && ntimes<10);
    if(ntimes>=10)interpolateSuccess=False;
  }
  ntimes=0;
  do{
    ntimes++;
    refLumaSadx = (refLumaSad0+refLumaSad1)/2; //simple successive
    approximation
    errorInAvgMaskedQp =
    GetAvgMaskedQp(nominalQp,refLumaSadx) - AMQP;
    if(errorInAvgMaskedQp>0)refLumaSad1=refLumaSadx;
    else refLumaSad0=refLumaSadx;
  }while( ABS (errorInAvgMaskedQp) > 0.05 && ntimes<12 );
  if(ntimes>=12)interpolateSuccess=False;
  }
  if (interpolateSuccess) return refLumaSadx;
  else return φ_R;
}
```

In the above pseudo code, the numbers 10, 12 and 0.05 may be replaced with suitably chosen thresholds.

After computing the reference masking strength for the next pass (pass p+1) through the encoding of the frame sequence, the process 100 transitions to 132 and starts the next pass (i.e., p:=p+1). For each frame k and each macroblock m during each encoding pass p, the process computes (at 132) a particular quantization parameter $MQP_p(k)$ for each frame k and particular quantization parameters $MQP_{MB(p)}(k, m)$ for individual macroblocks m within the frame k. The calculation of the parameters $MQP_p(k)$ and $MQP_{MB(p)}(k, m)$ for a given nominal quantization parameter $QP_{Nom(p)}$ and reference masking strength $\phi_{R(p)}$, were described in Section III. During the first pass through 132, the reference masking strength is the one that was just computed at 130. Also, during the second search stage, the nominal QP remains constant throughout the second search stage. In some embodiments, the nominal QP through the second search stage is the nominal QP that resulted in the best encoding solution (i.e., in the encoding solution with the lowest bit rate error) during the first search stage.

After 132, the process encodes (at 135) the frame sequence using the quantization parameters computed at 130. After 135, the process determines (at 140) whether it should terminate the second search stage. Different embodiments use different criteria for terminating the second search stage at the end of a pass p. Examples of such criteria are:

$|E_p| < \epsilon$, where $\epsilon$ is the error tolerance in the final bit rate The number of passes has exceeded the maximum number of passes allowed Some embodiments might use all of these exit conditions, while other embodiments might only use some of them. Yet other embodiments might use other exit conditions for terminating the first search stage.

When the process 100 determines (at 140) that it should not terminate the second search stage, it returns to 130 to recompute the reference masking strength for the next pass of encoding. From 130, the process transitions to 132 to compute quantization parameters and then to 135 to encode the video sequence by using the newly computed quantization parameters.

On the other hand, when the process decides (at 140) to terminate the second search stage, it transitions to 145. At 145, the process 100 saves the bitstream from the last pass p as the final result, and then terminates.

V. Decoder Input Buffer Underflow Control

Some embodiments of the invention provide a multi-pass encoding process that examines various encodings of a video sequence for a target bit rate, in order to identify an optimal encoding solution with respect to the usage of an input buffer used by the decoder. In some embodiment, this multi-pass process follows the multi-pass encoding process 100 of FIG. 1.

The decoder input buffer ("decoder buffer") usage will fluctuate to some degree during the decoding of an encoded sequence of images (e.g., frames), because of a variety of factors, such as fluctuation in the size of encoded images, the speed with which the decoder receives encoded data, the size of the decoder buffer, the speed of the decoding process, etc.

A decoder buffer underflow signifies the situation where the decoder is ready to decode the next image before that image has completely arrived at the decoder side. The multi-pass encoder of some embodiments simulates the decoder buffer and re-encode selected segments in the sequence to prevent decoder buffer underflow.

Figure 2:
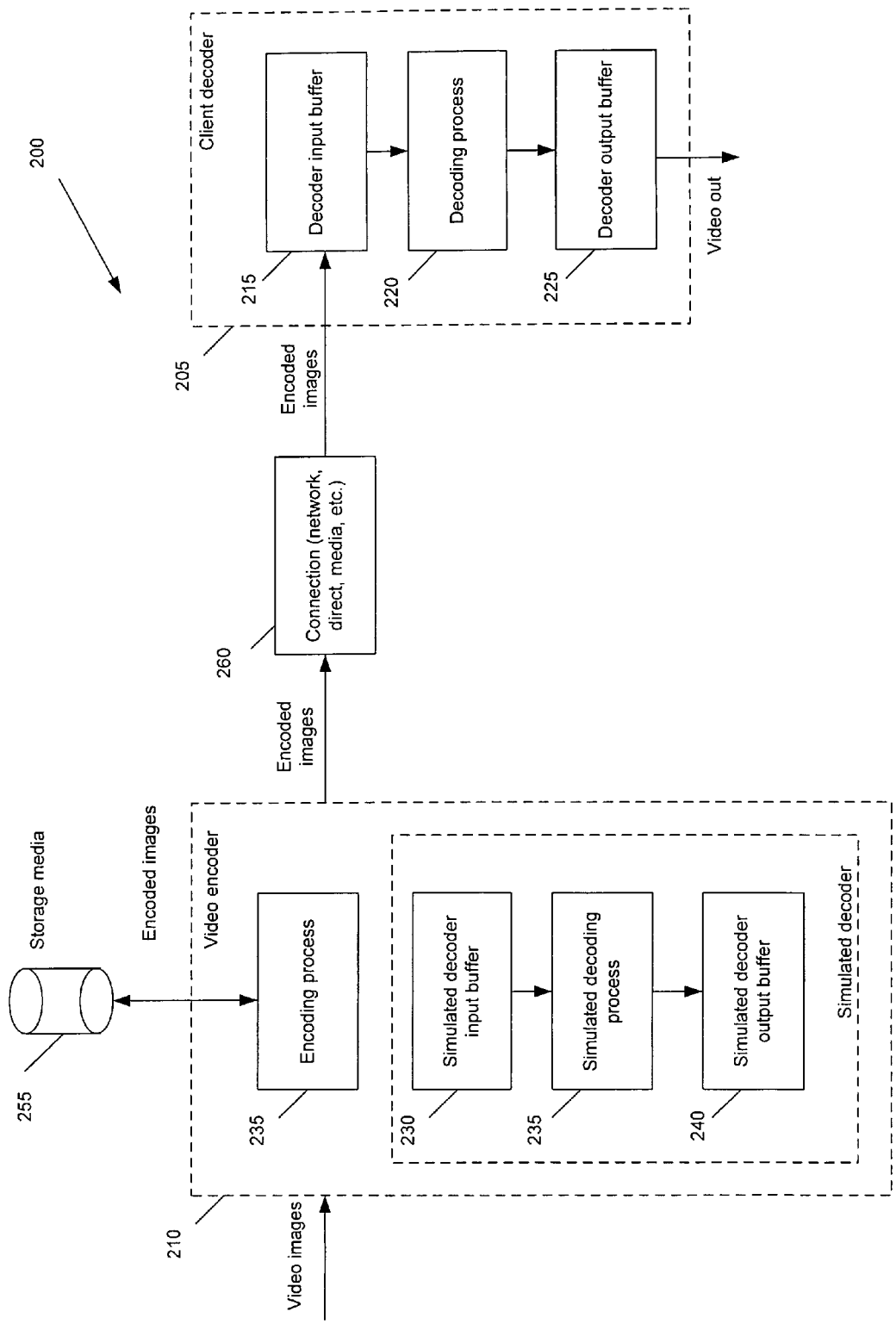
FIG. 2 conceptually illustrates a codec system of some embodiments.

FIG. 2 conceptually illustrates a codec system 200 of some embodiments of the invention. This system includes a decoder 205 and an encoder 210. In this figure, the encoder 210 has several components that enable it to simulate the operations of similar components of the decoder 205.

Specifically, the decoder 205 has an input buffer 215, a decoding process 220, and an output buffer 225. The encoder 210 simulates these modules by maintaining a simulated decoder input buffer 230, a simulated decoding process 235, and a simulated decoder output buffer 240. In order not to obstruct the description of the invention, FIG. 2 is simplified to show the decoding process 220 and encoding process 245 as single blocks. Also, in some embodiments, the simulated decoding process 235 and simulated decoder output buffer 240 are not utilized for buffer underflow management, and are therefore shown in this figure for illustration only.

The decoder maintains the input buffer 215 to smooth out variations in the rate and arrival time of incoming encoded images. If the decoder runs out of data (underflow) or fills up the input buffer (overflow), there will be visible decoding discontinuities as the picture decoding halts or incoming data is discarded. Both of these cases are undesirable.

To eliminate the underflow condition, the encoder 210 in some embodiments first encodes a sequence of images and stores them in a storage 255. For instance, the encoder 210 uses the multi-pass encoding process 100 to obtain a first encoding of the sequence of images. It then simulates the decoder input buffer 215 and re-encodes the images that would cause buffer underflow. After all buffer underflow conditions are removed, the re-encoded images are supplied to the decoder 205 through a connection 255, which maybe a network connection (Internet, cable, PSTN lines, etc.), a non-network direct connection, a media (DVD, etc.), etc.

Figure 3:
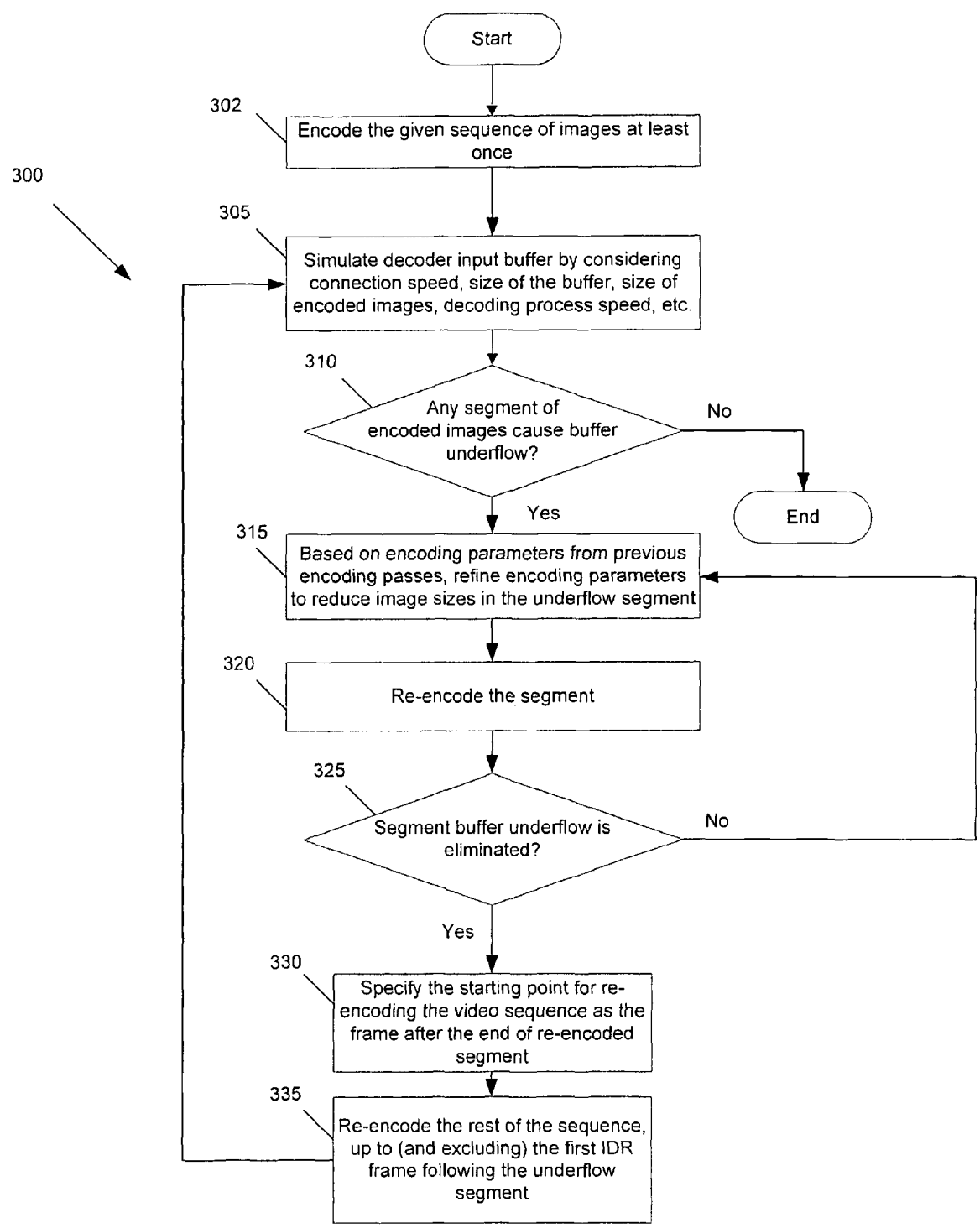
FIG. 3 is a flow chart illustrating an encoding process of some embodiments.

FIG. 3 illustrates an encoding process 300 of the encoder of some embodiments. This process tries to find an optimal encoding solution that does not cause the decoder buffer to underflow. As shown in FIG. 3, the process 300 identifies (at 302) a first encoding of the sequence of images that meets a desired target bit rate (e.g., the average bit rate for each image in the sequence meets a desired average target bit rate). For instance, the process 300 may use (at 302) the multi-pass encoding process 100 to obtain the first encoding of the sequence of images.

After 302, the encoding process 300 simulates (at 305) the decoder input buffer 215 by considering a variety of factors, such as the connection speed (i.e., the speed with which the decoder receives encoded data), the size of the decoder input buffer, the size of encoded images, the decoding process speed, etc. At 310, the process 300 determines if any segment of the encoded images will cause a decoder input buffer to underflow. The techniques that the encoder uses to determine (and subsequently eliminate) the underflow condition are described further below.

If the process 300 determines (at 310) that the encoded images do not create underflow condition, the process ends. On the other hand, if the process 300 determines (at 310) that a buffer underflow condition exists in any segment of the encoded images, it refines (at 315) the encoding parameters based on the value of these parameters from previous encoding passes. The process then re-encodes (at 320) the segment with underflow to reduce the segment bit size. After re-encoding the segment, the process 300 examines (at 325) the segment to determine if the underflow condition is eliminated.

When the process determines (at 325) that the segment still causes underflow, the process 300 transitions to 315 to further refine the encoding parameters to eliminate underflow. Alternatively, when the process determines (at 325) that the segment will not cause any underflow, the process specifies (at 330) that starting point for re-examining and re-encoding the video sequence as the frame after the end of the segment re-encoded in the last iteration at 320. Next, at 335, the process re-encodes the portion of the video sequence specified at 330, up to (and excluding) the first IDR frame following the underflow segment specified at 315 and 320. After 335, the process transitions back to 305 to simulate the decoder buffer to determine whether the rest of the video sequence still causes buffer underflow after re-encoding. The flow of the process 300 from 305 was described above.

A. Determining the Underflow Segment in the Sequence of Encoded Images

As described above, the encoder simulates the decoder buffer conditions to determine whether any segment in the sequence of the encoded or re-encoded images cause underflow in the decoder buffer. In some embodiments, the encoder uses a simulation model that considers the size of encoded images, network conditions such as bandwidth, decoder factors (e.g., input buffer size, initial and nominal time to remove images, decoding process time, display time of each image, etc.).

In some embodiments, the MPEG-4 AVC Coded Picture Buffer (CPB) model is used to simulate the decoder input buffer conditions. The CPB is the term used in MPEG-4H.264 standard to refer to the simulated input buffer of the Hypothetical Reference Decoder (HRD). The HRD is a hypothetical decoder model that specifies constraints on the variability of conforming streams that an encoding process may produce. The CPB model is well known and is described in Section 1 below for convenience. More detailed description of CPB and HRD can be found in Draft ITU-T Recommendation and Final Draft International Standard of Joint Video Specification (ITU-T Rec. H.264/ISO/IEC 14496-10 AVC).

1. Using the CPB Model to Simulate the Decoder Buffer

The following paragraphs describe how the decoder input buffer is simulated in some embodiments using the CPB model. The time at which the first bit of image n begins to enter the CPB is referred to as the initial arrival time $t_{ai}(n)$, which is derived as follows:

$t_{ai}(0)=0$, when the image is the first image (i.e., image 0),
$t_{ai}(n)=\text{Max}(t_{af}(n-1), t_{ai,\text{earliest}}(n))$, when the image is not the first image in the sequence being encoded or re-encoded (i.e., where n>0).

In the above equation, $t_{ai,\text{earliest}}(n)=t_{r,n}(n)-\text{initial\_cpb\_removal\_delay}$, where $t_{r,n}(n)$ is the nominal removal time of image n from the CPB as specified below and initial_cpb_removal_delay is the initial buffering period.

The final arrival time for image n is derived by $$t_{af}(n)=t_{ai}(n)+b(n)/\text{BitRate},$$

where b(n) is the size in bits of image n.

In some embodiments, the encoder makes its own calculations of the nominal removal time as described below instead of reading them from an optional part of the bit stream as in the H.264 specification. For image 0, the nominal removal time of the image from the CPB is specified by $$t_{r,n}(0)=\text{initial\_cpb\_removal\_delay}$$

For image n (n>0), the nominal removal time of the image from the CPB is specified by $$t_{r,n}(n)=t_{r,n}(0)+\text{sum}_{i=0 \text{ to } n-1}(t_i),$$

where $t_{r,n}(n)$ is the nominal removal time of image n, and $t_i$ is the display duration for picture i.

The removal time of image n is specified as follows.

$t_r(n)=t_{r,n}(n)$, when $t_{r,n}(n)>=t_{af}(n)$, $t_r(n)=t_{af}(n)$, when $t_{r,n}(n)<t_{af}(n)$ It is this latter case that indicates that the size of image n, b(n), is so large that it prevents removal at the nominal removal time.

2. Detection of Underflow Segments

As described in the previous section, the encoder can simulate the decoder input buffer state and obtain the number of bits in the buffer at a given time instant. Alternatively, the encoder can track how each individual image changes the decoder input buffer state via the difference between its nominal removal time and final arrival time (i.e., $t_b(n)=t_{r,n}(n)-t_{af}(n)$). When $t_b(n)$ is less than 0, the buffer is suffering from underflow between time instants $t_{r,n}(n)$ and $t_{af}(n)$, and possibly before $t_{r,n}(n)$ and after $t_{af}(n)$.

The images directly involved in an underflow can be easily found by testing whether $t_b(n)$ is less than 0. However, the images with $t_b(n)$ less than 0 do not necessarily cause an underflow, and conversely the images causing an underflow might not have $t_b(n)$ less than 0. Some embodiments define an underflow segment as a stretch of consecutive images (in decoding order) that cause underflow by continuously depleting the decoder input buffer until underflow reaches its worst point.

Figure 4:
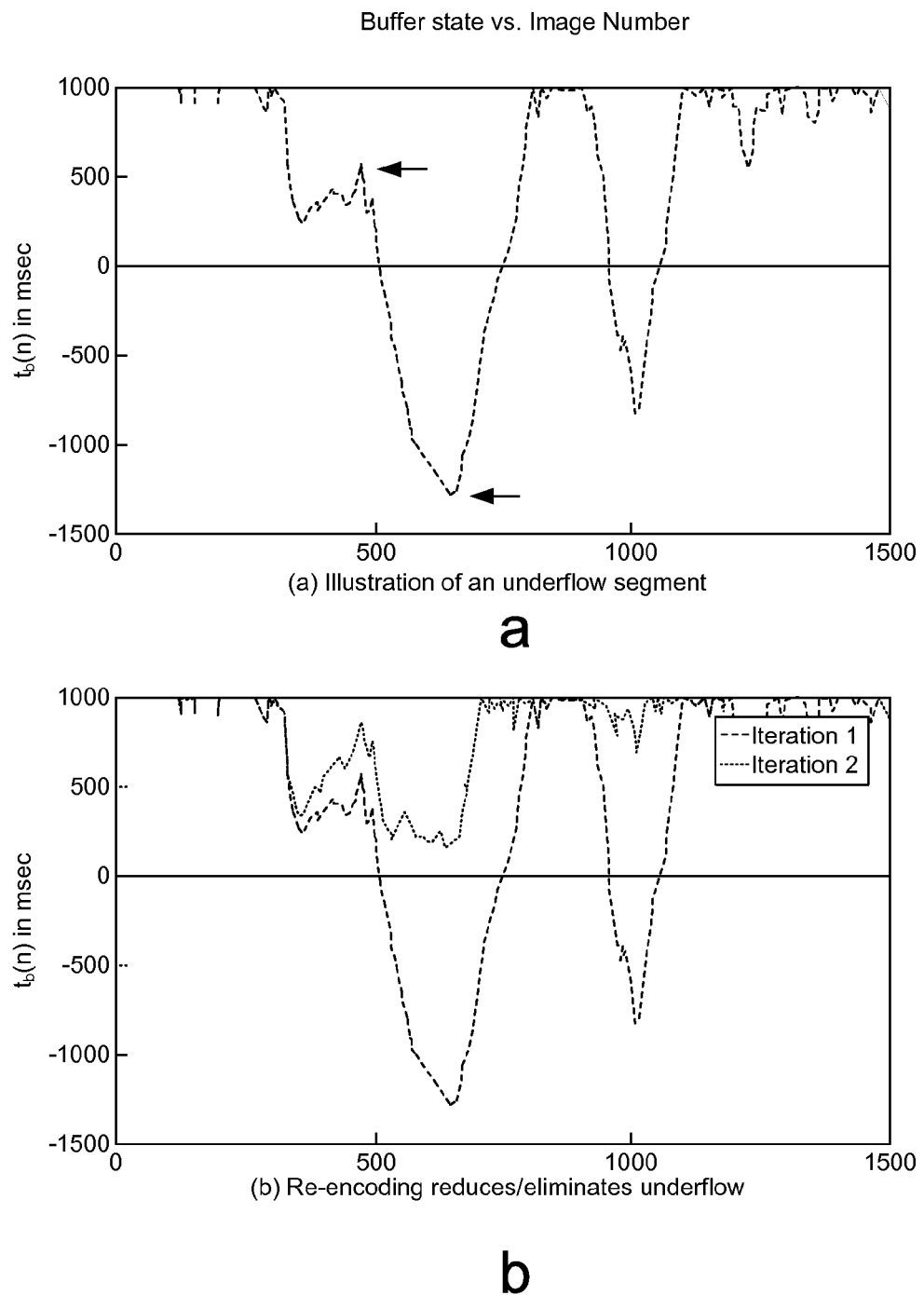
FIG. 4a is a plot of the difference between nominal removal time and final arrival time of images versus image number illustrating an underflow condition in some embodiments.
FIG. 4b illustrates a plot of the difference between nominal removal time and final arrival time of images versus image number for the same images shown in FIG. 4a after the underflow condition is eliminated.

FIG. 4 is a plot of the difference between nominal removal time and final arrival of images $t_b(n)$ versus image number in some embodiments. The plot is drawn for a sequence of 1500 encoded images. FIG. 4a shows an underflow segment with arrows marking its beginning and end. Note that there is another underflow segment in FIG. 4a that occurs after the first underflow segment, which is not explicitly marked by arrows for simplicity.

Figure 5:
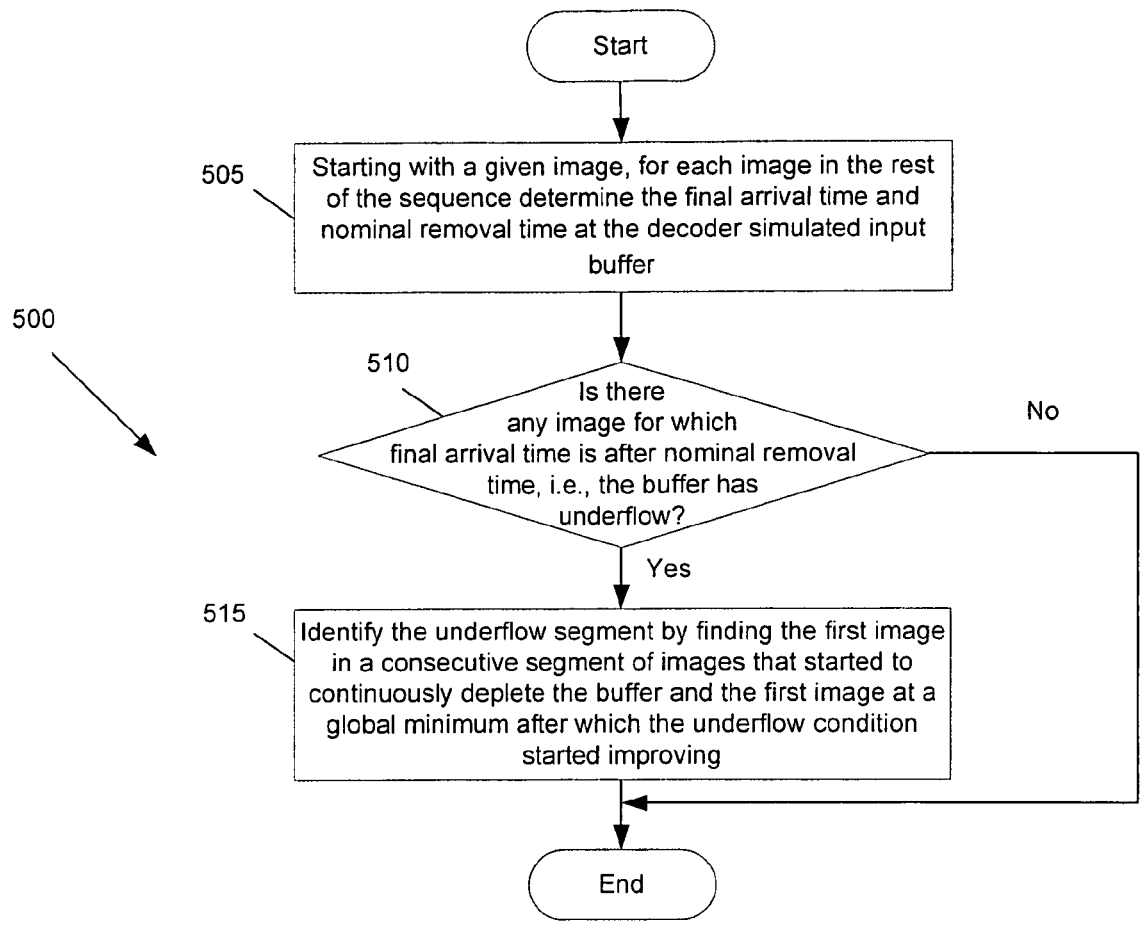
FIG. 5 illustrates a process that the encoder uses to perform underflow detection in some embodiments.

FIG. 5 illustrates a process 500 that the encoder uses to perform the underflow detection operation at 305. The process 500 first determines (at 505) the final arrival time, $t_{af}$, and nominal removal time, $t_{r,n}$, of each image by simulating the decoder input buffer conditions as explained above. Note that since this process may be called several times during the iterative process of buffer underflow management, it receives an image number as the starting point and examines the sequence of images from this given starting image. Obviously, for the first iteration, the starting point is the first image in the sequence.

At 510, the process 500 compares the final arrival time of each image at the decoder input buffer with the nominal removal time of that image by the decoder. If the process determines that there are no images with final arrival time after the nominal removal time (i.e., no underflow condition exits), the process exits. On the other hand, when an image is found for which the final arrival time is after the nominal removal time, the process determines that there is an underflow and transitions to 515 to identify the underflow segment.

At 515, the process 500 identifies the underflow segment as the segment of the images where the decoder buffer starts to be continuously depleted until the next global minimum where the underflow condition starts to improve (i.e., $t_b(n)$ does not get more negative over a stretch of images). The process 500 then exits. In some embodiments, the beginning of the underflow segment is further adjusted to start with an I-frame, which is an intra-encoded image that marks the starting of a set of related inter-encoded images. Once one or more segments that are causing the underflow are identified, the encoder proceeds to eliminate the underflow. Section B below describes elimination of underflow in a single-segment case (i.e., when the entire sequence of encoded images only contains a single underflow segment). Section C then describes elimination of underflow for the multi-segment underflow cases.

B. Single-Segment Underflow Elimination

Referring to FIG. 4(a), if the $t_b(n)$-versus-n curve only crosses the n-axis once with a descending slope, then there is only one underflow segment in the entire sequence. The underflow segment begins at the nearest local maximum preceding the zero-crossing point, and ends at the next global minimum between the zero-crossing point and the end of the sequence. The end point of the segment could be followed by another zero-crossing point with the curve taking an ascending slope if the buffer recovers from the underflow.

Figure 6:
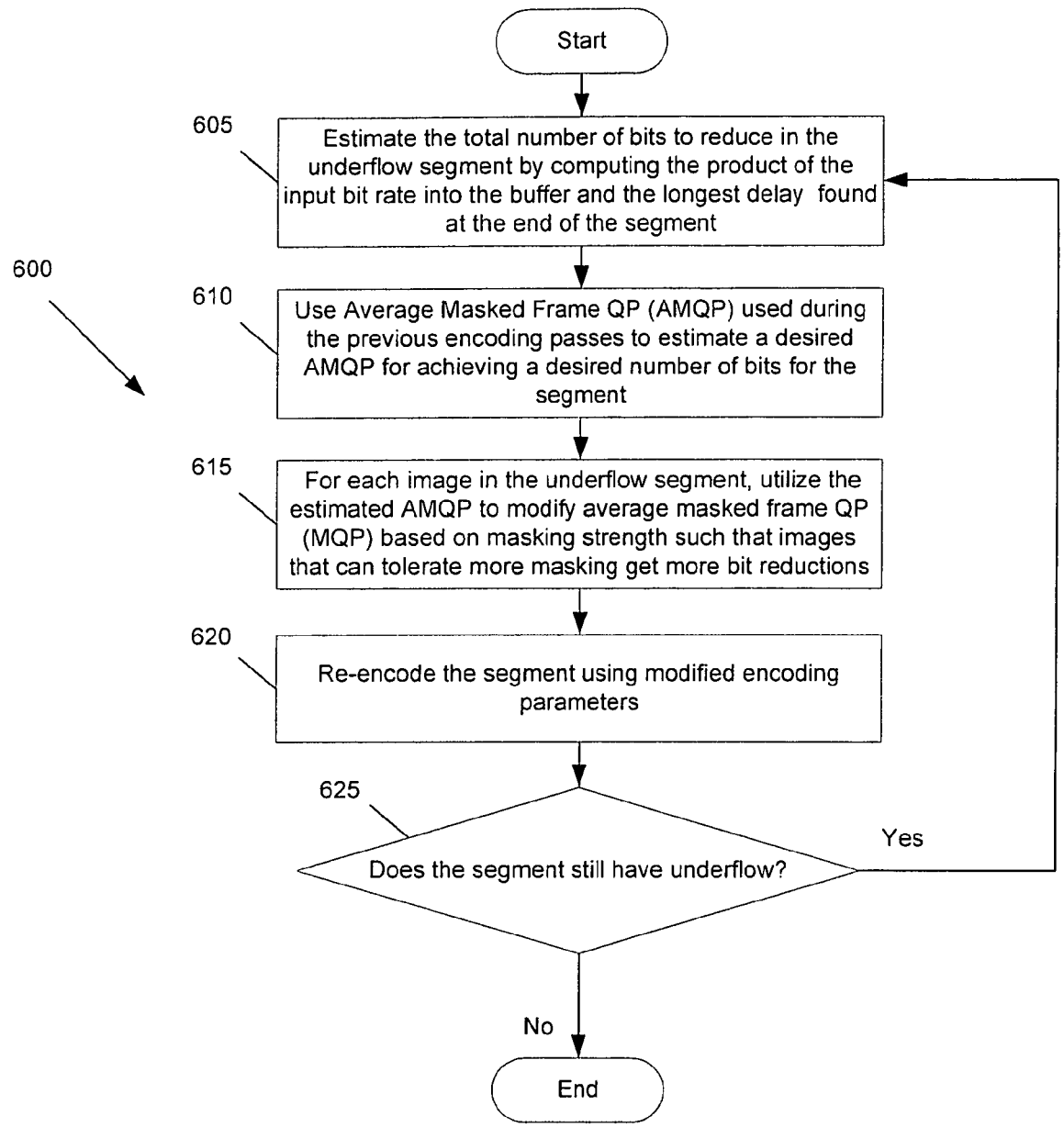
FIG. 6 illustrates a process the encoder utilizes to eliminate the underflow condition in a single segment of images in some embodiments.

FIG. 6 illustrates a process 600 the encoder utilizes (at 315, 320, and 325) to eliminate underflow condition in a single segment of images in some embodiments. At 605, the process 600 estimates the total number of bits to reduce (ΔB) in the underflow segment by computing the product of the input bit rate into the buffer and the longest delay (e.g., minimum $t_b(n)$) found at the end of the segment.

Next, at 610, the process 600 uses the average masked frame QP (AMQP) and total number of bits in the current segment from the last encoding pass (or passes) to estimate a desired AMQP for achieving a desired number of bits for the segment, $B_T=B-\Delta B_p$, where p is the current number of iterations of the process 600 for the segment. If this iteration is the first iteration of process 600 for the particular segment, AMQP and total number of bits are the AMQP and the total number of bits for this segment that are derived from the initial encoding solution identified at 302. On the other hand, when this iteration is not the first iteration of process 600, these parameters can be derived from the encoding solution or solutions obtained in the last pass or last several passes of the process 600.

Next, at 615, the process 600 uses the desired AMQP to modify average masked frame QP, MQP(n), based on masking strength $\phi_F(n)$ such that images that can tolerate more masking get more bit reductions. The process then re-encodes (at 620) the video segment based on the parameters defined at 315. The process then examines (at 625) the segment to determine whether the underflow condition is eliminated. FIG. 4(b) illustrates the elimination of the underflow condition of FIG. 4(a) after process 600 is applied to the underflow segment to re-encode it. When the underflow condition is eliminated, the process exits. Otherwise, it will transition back to 605 to further adjust encoding parameters to reduce total bit size.

C. Underflow Elimination with Multiple Underflow Segments

When there are multiple underflow segments in a sequence, re-encoding of a segment changes the buffer fullness time, $t_b(n)$, for all the ensuing frames. To account for the modified buffer condition, the encoder searches for one underflow segment at a time, starting from the first zero-crossing point (i.e., at the lowest n) with a descending slope.

The underflow segment begins at the nearest local maximum preceding this zero-crossing point, and ends at the next global minimum between the zero-crossing point and the next zero-crossing point (or the end of the sequence if there is no more zero crossing). After finding one segment, the encoder hypothetically removes the underflow in this segment and estimates the updated buffer fullness by setting $t_b(n)$ to 0 at the end of the segment and redoing the buffer simulation for all subsequent frames.

The encoder then continues searching for the next segment using the modified buffer fullness. Once all underflow segments are identified as described above, the encoder derives the AMQPs and modifies the Masked frame QPs for each segment independently of the others just as in the single-segment case.

One of ordinary skill would realize that other embodiments might be implemented differently. For instance, some embodiments would not identify multiple segments that cause underflow of the input buffer of the decoder. Instead, some embodiments would perform buffer simulation as described above to identify a first segment that causes underflow. After identifying such a segment, these embodiments correct the segment to rectify underflow condition in that segment and then resume encoding following the corrected portion. After the encoding of the remainder of the sequence, these embodiments will repeat this process for the next underflow segment.

D. Applications of Buffer Underflow Management

The decoder buffer underflow techniques described above applies to numerous encoding and decoding systems. Several examples of such systems are described below.

Figure 7:
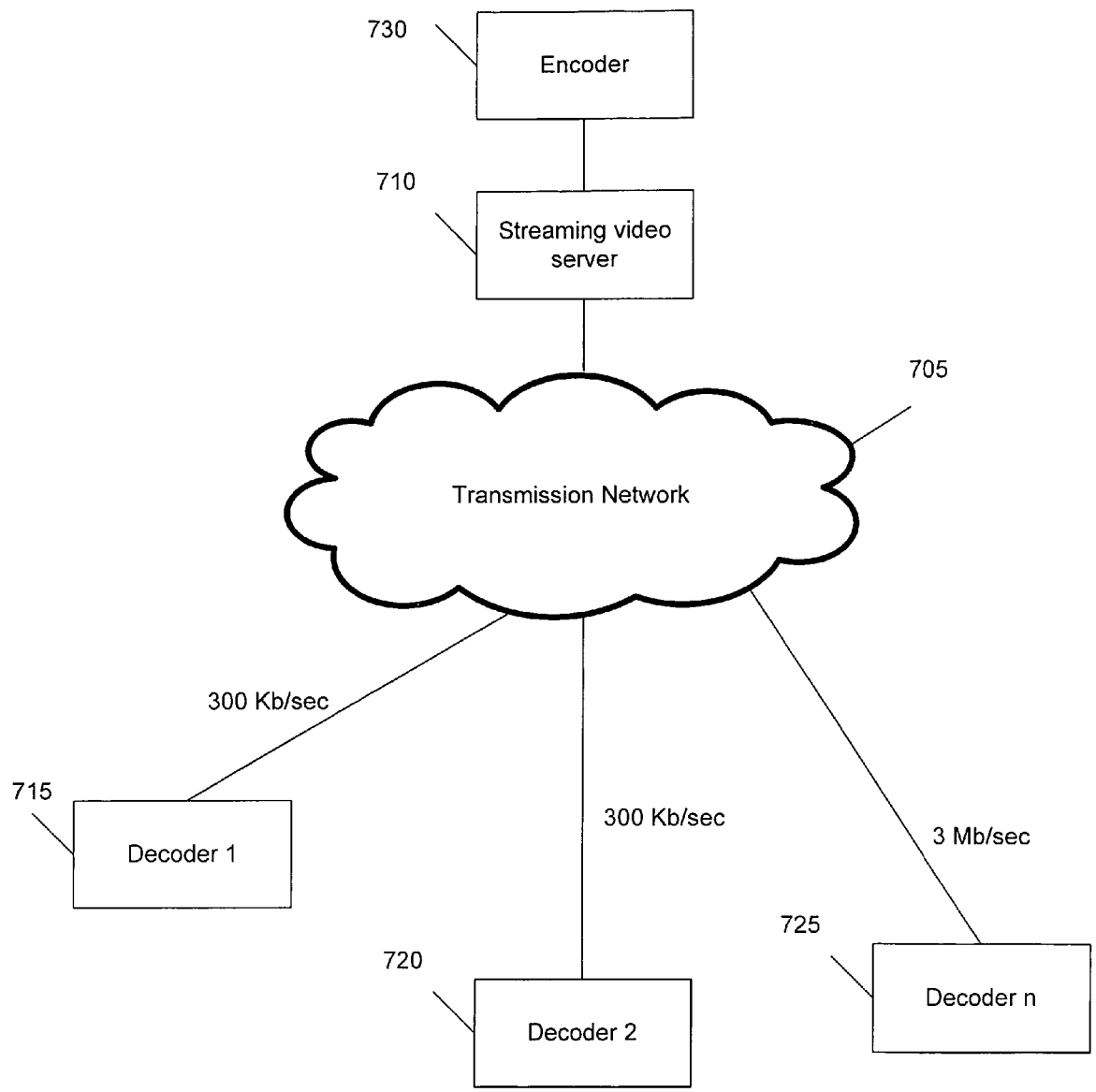
FIG. 7 illustrates an application of buffer underflow management in a video streaming application.

FIG. 7 illustrates a network 705 connecting a video streaming server 710 and several client decoders 715-725. Clients are connected to the network 705 via links with different bandwidths such as 300 Kb/sec and 3 Mb/sec. The video streaming server 710 is controlling streaming of encoded video images from an encoder 730 to the client decoders 715-725.

The streaming video server may decide to stream the encoded video images using the slowest bandwidth in the network (i.e., 300 Kb/sec) and the smallest client buffer size. In this case, the streaming server 710 needs only one set of encoded images that are optimized for a target bit rate of 300 Kb/sec. On the other hand, the server may generate and store different encodings that are optimized for different bandwidths and different client buffer conditions.

Figure 8:
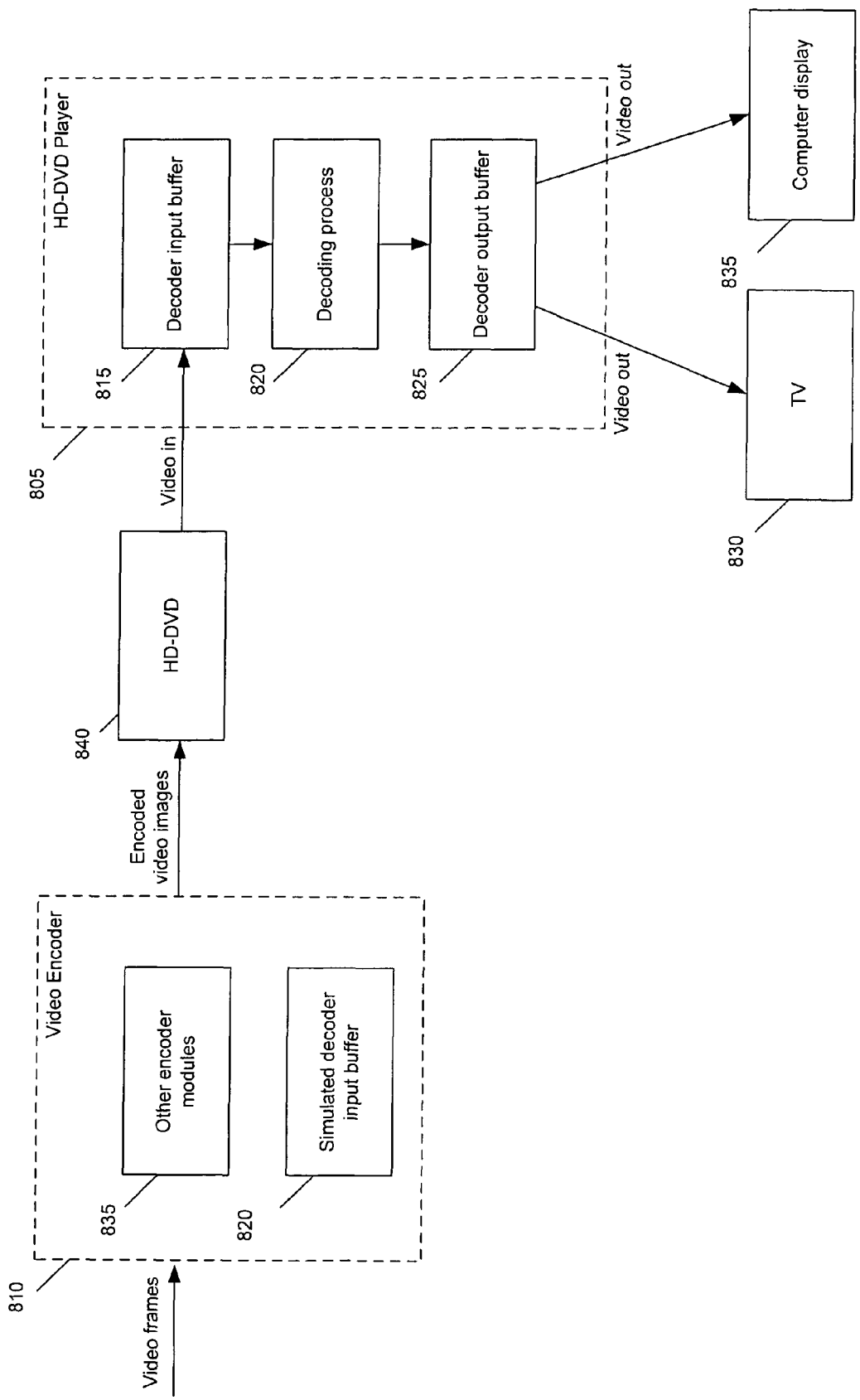
FIG. 8 illustrates an application of buffer underflow management in an HD-DVD system.

FIG. 8 illustrates another example of an application for decoder underflow management. In this example, an HD-DVD player 805 is receiving encoded video images from an HD-DVD 840 that has stored encoded video data from a video encoder 810. The HD-DVD player 805 has an input buffer 815, a set of decoding modules shown as one block 820 for simplicity, and an output buffer 825.

The output of the player 805 is sent to display devices such as TV 830 or computer display terminal 835. The HD-DVD player may have a very high bandwidth, e.g. 29.4 Mb/sec. In order to maintain a high quality image on the display devices, the encoder ensures that the video images are encoded in a way that no segments in the sequence of images would be so large that cannot be delivered to the decoder input buffer on time.

VI. Computer System

Figure 9:
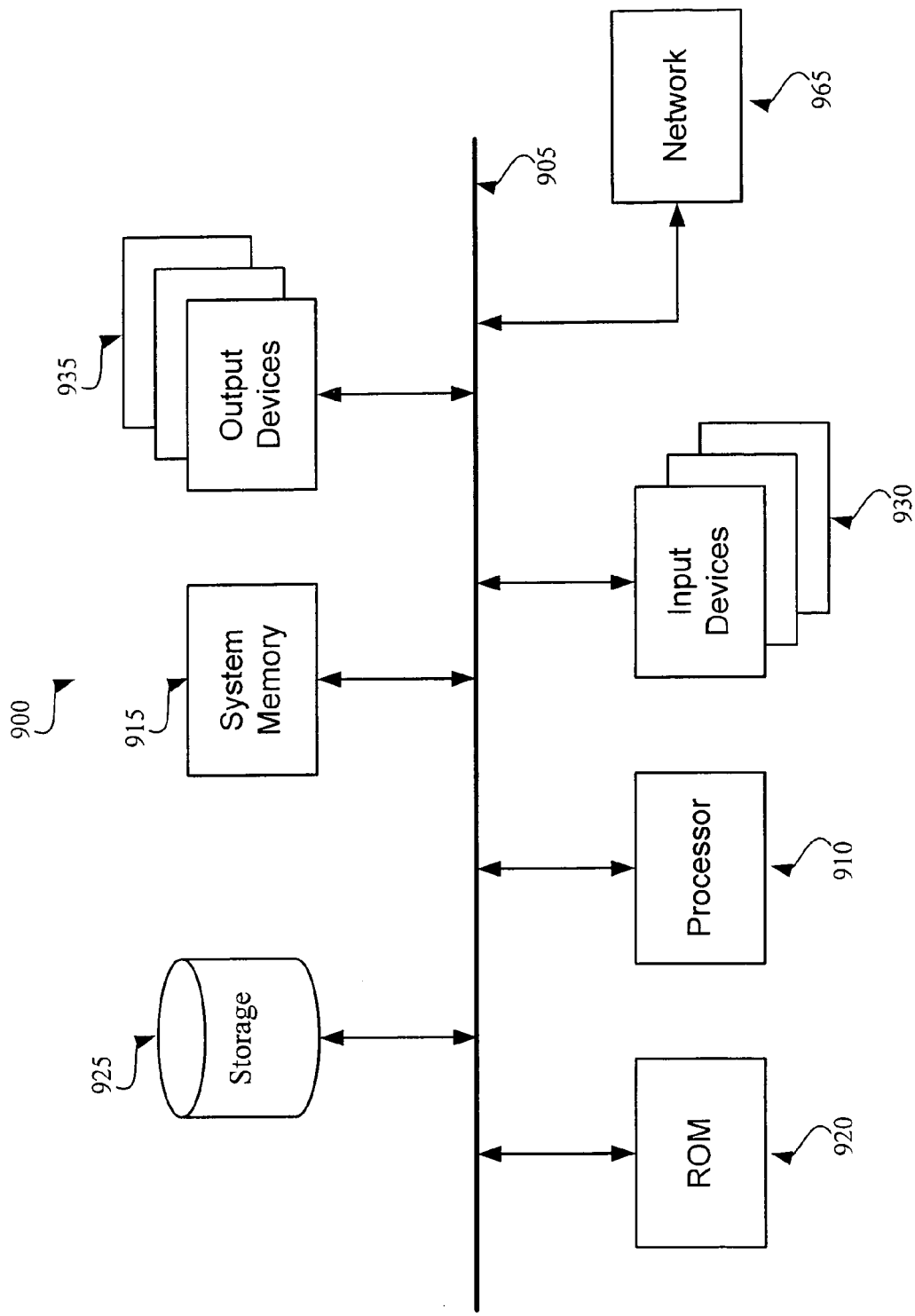
FIG. 9 presents a computer system with which one embodiment of the invention is implemented.

FIG. 9 presents a computer system with which one embodiment of the invention is implemented. Computer system 900 includes a bus 905, a processor 910, a system memory 915, a read-only memory 920, a permanent storage device 925, input devices 930, and output devices 935. The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925.

From these various memory units, the processor 910 retrieves instructions to execute and data to process in order to execute the processes of the invention. The read-only-memory (ROM) 920 stores static data and instructions that are needed by the processor 910 and other modules of the computer system.

The permanent storage device 925, on the other hand, is read-and-write memory device. This device is a non-volatile memory unit that stores instruction and data even when the computer system 900 is off. Some embodiments of the invention use a mass-storage device (such as a magnetic or optical disk and its corresponding disk drive) as the permanent storage device 925.

Other embodiments use a removable storage device (such as a floppy disk or zips disk, and its corresponding disk drive) as the permanent storage device. Like the permanent storage device 925, the system memory 915 is a read-and-write memory device. However, unlike storage device 925, the system memory is a volatile read-and-write memory, such as a random access memory. The system memory stores some of the instructions and data that the processor needs at runtime. In some embodiments, the invention's processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keyboards and cursor-controllers. The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet) or a network of networks (such as the Internet). Any or all of the components of computer system 900 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, instead of using H264 method of simulating the decoder input buffer other simulation methods may be used that consider the buffer size, arrival and removal times of images in the buffer, and decoding and display times of the images.

Several embodiments described above compute the mean removed SAD to obtain an indication of the image variance in a macroblock. Other embodiments, however, might identify the image variance differently. For example, some embodiments might predict an expected image value for the pixels of a macroblock. These embodiments then generate a macrolock SAD by subtracting this predicted value form the luminance value of the pixels of the macroblock, and summing the absolute value of the subtractions. In some embodiments, the predicted value is based on not only the values of the pixels in the macroblock but also the value of the pixels in one or more of the neighboring macroblocks.

Also, the embodiments described above use the derived spatial and temporal masking values directly. Other embodiments will apply a smoothing filtering on successive spatial masking values and/or to successive temporal masking values before using them in order to pick out the general trend of those values through the video images. Thus, one of ordinary skill in the art would understand that the invention is not to be limited by the foregoing illustrative details.

What is claimed is:

1. A method of encoding video, the method comprising:
calculating a motion compensated error signal of pixel regions defined within a first portion of a first image in a video sequence;
generating an amalgamated motion compensated error signal of pixel regions defined within a plurality of second portions of a plurality of other images in the video sequence using a motion compensated error signal for each second portion and a weighting factor for each image in the plurality of other images, wherein the weighting factor of an image in the plurality of other images is larger when the image is closer to the first image in the video sequence;
identifying a first visual masking strength for the first portion of the first image in the video sequence, wherein the first portion is less than an entire of the first image, wherein the first visual masking strength quantifies a degree to which coding artifacts are not perceptible to a viewer due to complexity of the first portion, wherein the first visual masking strength is a function of the motion compensated error signal for the first image and the amalgamated motion compensated error signal;
identifying a second visual masking strength for the entire first image in the video sequence, wherein the second visual masking strength quantifies a degree to which coding artifacts are not perceptible to a viewer due to complexity of the entire first image;
computing a quantization parameter as a function of the identified first and second visual masking strengths; and
by an encoder, encoding at least a part of the first image based on the computed quantization parameter.

2. The method of claim 1, wherein the first visual masking strength specifies a spatial complexity of the first portion.

3. The method of claim 2, wherein the spatial complexity is calculated as a function of pixel values of a part of the image.

4. The method of claim 3, wherein the first portion has a plurality of pixels and an image value for each pixel, wherein identifying the first visual masking strength for the first portion comprises:
estimating an image value for each of the pixels of the first portion;
subtracting a statistical attribute from the image values of the pixels of the first portion; and
computing the visual masking strength based on a result of the subtraction.

5. The method of claim 4, wherein the estimated image value is another statistical attribute of the image values of pixels of the first portion.

6. The method of claim 5, wherein the statistical attribute is a mean.

7. The method of claim 4, wherein the estimated image value is based partly on pixels that neighbor the pixels of the first portion.

8. The method of claim 1, wherein the first visual masking strength comprises a temporal complexity of the first portion.

9. The method of claim 8, wherein the temporal complexity is calculated as a function of a motion compensated error signal of pixel regions defined within the first portion of the first image.

10. The method of claim 8, wherein the temporal complexity is calculated as a function of a motion compensated error signal of the pixel regions defined within the first portion of the first image and a motion compensated error signal of pixels defined within a set of second portions of a set of other images.

11. The method of claim 10, wherein the set of other images includes only one image.

12. The method of claim 10, wherein the set of other image includes only images that are part of a scene with the first image and does not include any images that relate to another scene.

13. The method of claim 10, wherein the other images are selected from a set of past images occurring before the first image and a set of future images occurring after the first image.

14. The method of claim 1, wherein the weighting factors for a set of images in the plurality of other images that is not part of a scene with the first image are selected to eliminate the set of images.

15. The method of claim 1, wherein the first visual masking strength comprises a spatial complexity component and a temporal complexity component, the method further comprising:
    comparing the spatial complexity component and the temporal complexity component to each other; and
    modifying the spatial complexity component and the temporal complexity component based on certain criteria to maintain a contribution of the spatial complexity component and a contribution of the temporal complexity component to the first visual masking strength within a threshold range of one another.

16. The method of claim 15, wherein the temporal complexity component is adjusted to account for an upcoming scene change within a look ahead range of certain frames.

17. The method of claim 1, wherein the first visual masking strength specifies a brightness attribute of the first portion.

18. The method of claim 1, wherein computing the quantization parameter comprises computing the quantization parameter based on a difference between the first visual masking strength and the second visual masking strength.

19. The method of claim 1, wherein computing the quantization parameter comprises computing the quantization parameter based on (i) a difference between the first visual masking strength and the second visual masking strength, and (ii) a relationship between the difference and the second visual masking strength.

20. The method of claim 1, wherein the first portion is a macroblock within the first image.

21. The method of claim 1 further comprising adjusting the quantization parameter based on error in bit rate after an encoding pass.

22. A non-transitory computer readable medium storing a computer program for encoding video, the computer program executable by at least one processor, the computer program comprising sets of instructions for:
    calculating a motion compensated error signal of pixel regions defined within a first portion of a first image in a video sequence;
    generating an amalgamated motion compensated error signal of pixel regions defined within a plurality of second portions of a plurality of other images in the video sequence using a motion compensated error signal for each second portion and a weighting factor for each image in the plurality of other images, wherein the weighting factor of an image in the plurality of other images is larger when the image is closer to the first image in the video sequence;
    identifying a first visual masking strength for the first portion of the first image in the video sequence, wherein the first portion is less than an entire of the first image, wherein the first visual masking strength quantifies a complexity of the first portion of the first image in the video sequence, wherein the first visual masking strength is a function of the motion compensated error signal for the first image and the amalgamated motion compensated error signal;
    identifying a reference visual masking strength for portions of a set of images in the video sequence;
    computing a first quantization parameter for the entire first image as a function of the identified reference visual masking strength;
    computing a second quantization parameter for the first portion of the first image as a function of the identified first visual masking strength and the computed first quantization parameter; and
    encoding at least a part of the first image based on the computed second quantization parameter.

23. The non-transitory computer readable medium of claim 22, wherein the first visual masking strength quantifies a degree to which coding artifacts are not perceptible to a viewer due to the spatial complexity of the first portion.

24. The non-transitory computer readable medium of claim 22, wherein the first visual masking strength quantifies a degree to which coding artifacts are not perceptible to a viewer due to a motion in the video, wherein the motion is captured by the first image and a set of images before and after the first image.

25. The non-transitory computer readable medium of claim 22, wherein the first visual masking strength comprises a spatial complexity component and a temporal complexity component, the computer program further comprising sets of instructions for:
    comparing the spatial complexity component and the temporal complexity component to each other; and
    modifying the spatial complexity component and the temporal complexity component based on a set of criteria to maintain a contribution of the spatial complexity component and a contribution of the temporal complexity component to the first visual masking strength within a threshold range of one another.

26. The non-transitory computer readable medium of claim 25, wherein the temporal complexity component is adjusted to account for an upcoming scene change within a look ahead range of certain frames.

27. The non-transitory computer readable medium of claim 22, wherein first the visual masking strength comprises a spatial complexity component and a temporal complexity component, the computer program further comprising a set of instructions for altering the spatial complexity component and the temporal complexity component by smoothing out a temporal trend of the spatial complexity and the temporal complexity within a set of images.

28. The non-transitory computer readable medium of claim 22, wherein the first visual masking strength specifies a brightness attribute of the first portion.

29. The non-transitory computer readable medium of claim 22, wherein the reference visual masking strength is an average of a second visual masking strength for each image in the set of images.

30. The non-transitory computer readable medium of claim 22, wherein the reference visual masking strength is a mean of a second visual masking strength for each image in the set of images.

31. The non-transitory computer readable medium of claim 22, wherein the set of instructions for computing the first quantization parameter comprises a set of instructions for computing the first quantization parameter based on a difference between a second visual masking strength for the entire first image and the reference visual masking strength.

32. The non-transitory computer readable medium of claim 22, wherein the set of instructions for computing the first quantization parameter comprises a set of instructions for computing the first quantization parameter based on (i) a difference between a second visual masking strength for the entire first image and the reference visual masking strength, and (ii) a relationship between the difference and the reference visual masking strength.

33. The non-transitory computer readable medium of claim 22, wherein the computer program further comprises a set of instructions for adjusting the reference visual masking strength based on error in bit rate after an encoding pass.

34. The non-transitory computer readable medium of claim 22, wherein the computer program further comprises a set of instructions for adjusting the reference visual masking strength based on (i) a first error in bit rate after an encoding pass, and (ii) a second error in bit rate after another encoding pass.

35. The non-transitory computer readable medium of claim 22, wherein the computer program further comprises a set of instructions for adjusting the reference visual masking strength based on an average quantization parameter for the set of images after an encoding pass.

* * * * *